(12) United States Patent
Bevirt et al.

(10) Patent No.: US 11,932,400 B2
(45) Date of Patent: Mar. 19, 2024

(54) THREE-DIMENSIONAL EXTENSION LINKAGE FOR AIRCRAFT

(71) Applicant: Joby Aero, Inc., Santa Cruz, CA (US)

(72) Inventors: Joeben Bevirt, Santa Cruz, CA (US); Gregor Veble Mikić, Santa Cruz, CA (US); Joachim Grenestedt, Santa Cruz, CA (US); Robert Thodal, Santa Cruz, CA (US); Edward Stilson, Santa Cruz, CA (US); Percy Pei, Santa Cruz, CA (US); Drew Boggio, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 17/710,919

(22) Filed: Mar. 31, 2022

(65) Prior Publication Data
US 2022/0219804 A1    Jul. 14, 2022

Related U.S. Application Data

(63) Continuation of application No. 17/033,178, filed on Sep. 25, 2020, now Pat. No. 11,292,581.

(60) Provisional application No. 62/906,407, filed on Sep. 26, 2019.

(51) Int. Cl.
*B64C 9/02* (2006.01)
*B64C 9/18* (2006.01)
*B64C 9/00* (2006.01)

(52) U.S. Cl.
CPC .................. *B64C 9/02* (2013.01); *B64C 9/18* (2013.01); *B64C 2009/005* (2013.01)

(58) Field of Classification Search
CPC ....... B64C 9/02; B64C 9/18; B64C 2009/005; B64C 9/04; B64C 13/0425; B64C 3/50; B64C 9/34
See application file for complete search history.

(56) References Cited

U.S. PATENT DOCUMENTS

| | | | |
|---|---|---|---|
| 4,614,320 A * | 9/1986 | Rutan | B64C 9/18 244/218 |
| 7,726,610 B2 | 6/2010 | Good et al. | |
| 8,517,315 B2 | 8/2013 | Andreani | |
| 8,596,583 B2 | 12/2013 | Eichhorn et al. | |
| 9,334,043 B2 | 5/2016 | Schlipf et al. | |
| 9,694,911 B2 | 7/2017 | Bevirt et al. | |
| 10,315,760 B2 | 6/2019 | Bevirt et al. | |
| 2009/0057493 A1* | 3/2009 | Sankrithi | B64C 39/04 244/54 |
| 2012/0224964 A1* | 9/2012 | Clark | B64C 9/18 74/96 |
| 2016/0031556 A1 | 2/2016 | Bevirt et al. | |

(Continued)

*Primary Examiner* — Rodney A Bonnette
(74) *Attorney, Agent, or Firm* — Michael A. Guth

(57) ABSTRACT

An extension linkage for a wing flap can include at least one arm that includes two elements connected by a joint. The linkage can include an actuation mechanism, additional arms and/or each arm can include more than two elements, tie rods and/or cross pieces connecting two or more arms, and any other suitable components. The linkage functions to translate and rotate a body attached to one end of the arm relative to a primary structure attached to a second end of the arm. The linkage resides entirely within a space defined by the upper skin and the lower skin of the wing rearward of the mounting when in a retracted configuration.

7 Claims, 22 Drawing Sheets

(56) References Cited

U.S. PATENT DOCUMENTS

2019/0092454 A1* 3/2019 Mortland ................ B64C 9/16
2019/0168388 A1 6/2019 Pringle, IV et al.
2019/0359314 A1* 11/2019 Tsai ........................ B64C 9/18

* cited by examiner

RETRACTED CONFIGURATION

EXTENDED CONFIGURATION

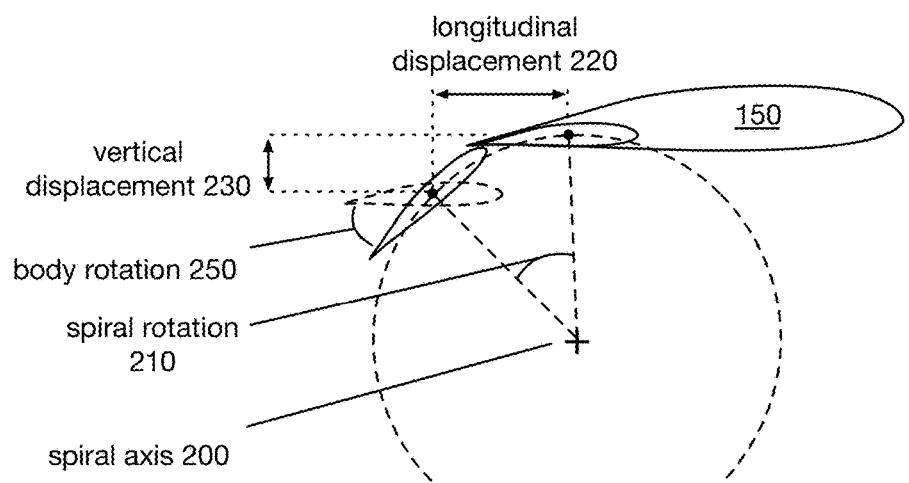
FIGURE 13
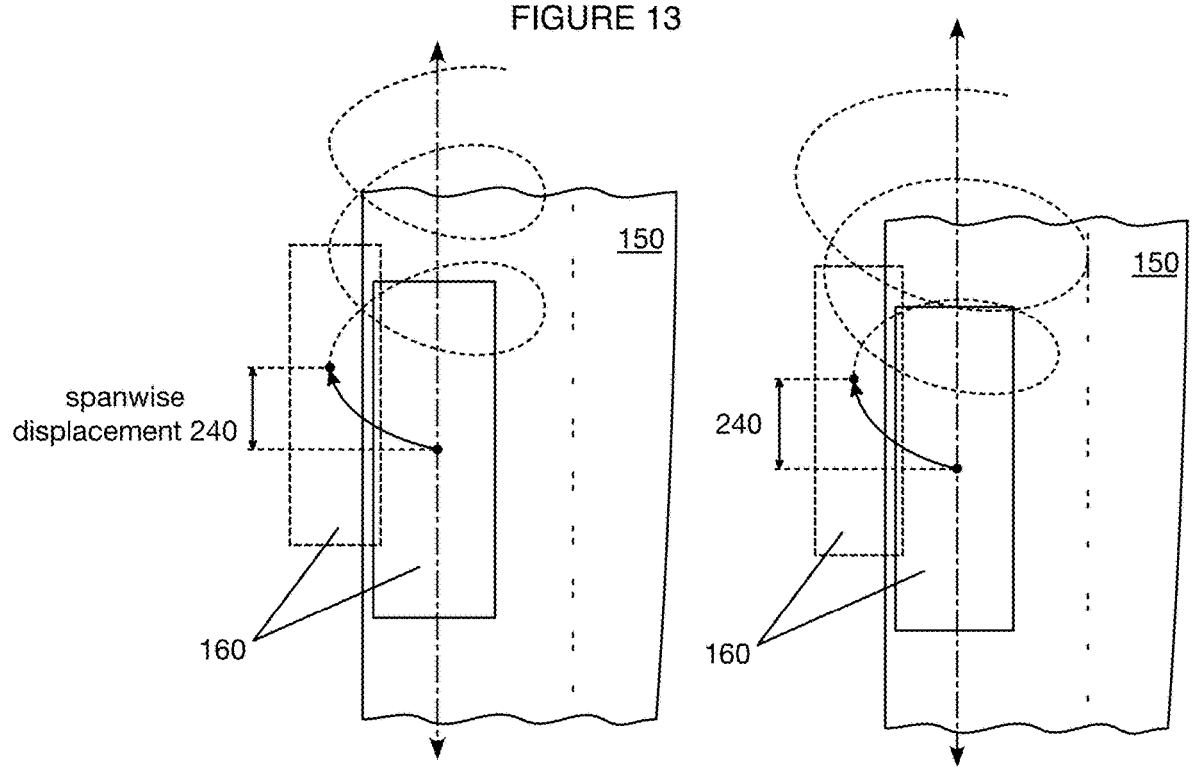
FIGURE 14A
FIGURE 14B

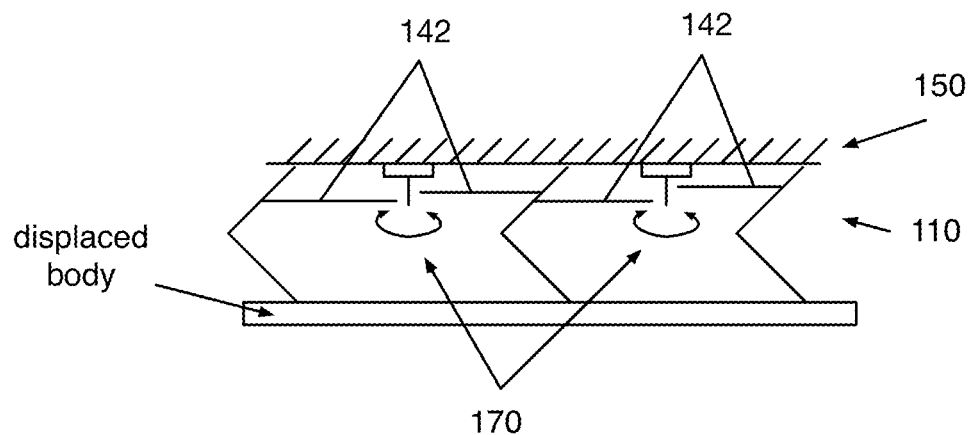
FIGURE 26
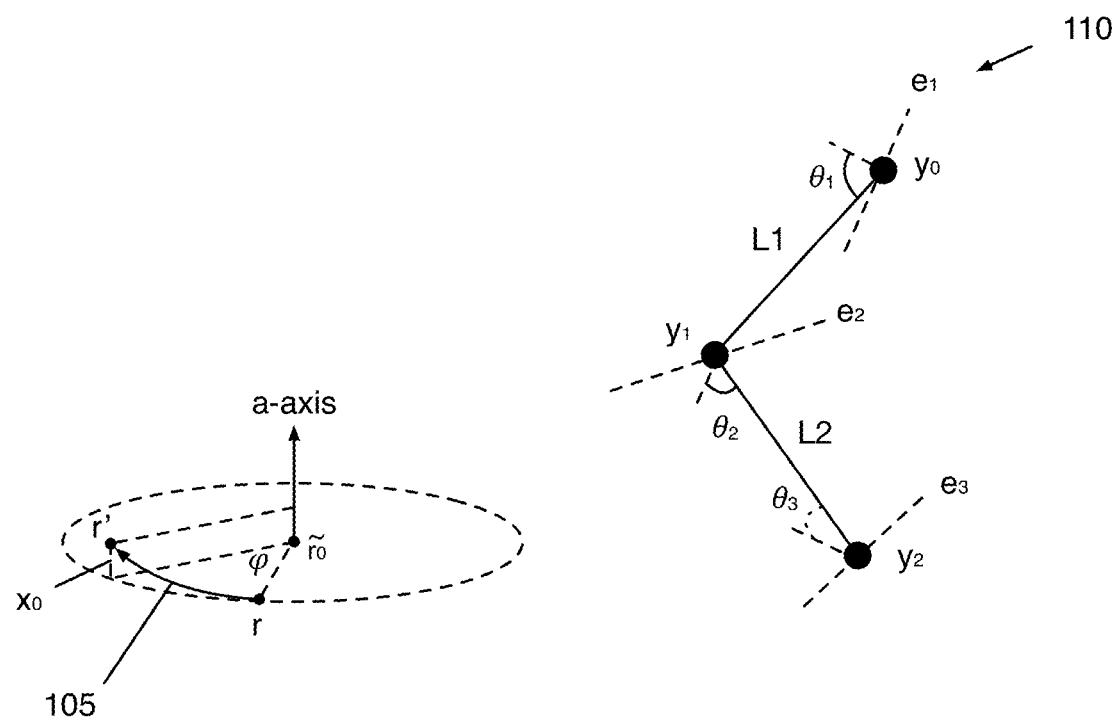
FIGURE 27A
FIGURE 27B

THREE-DIMENSIONAL EXTENSION LINKAGE FOR AIRCRAFT

CROSS-REFERENCE TO RELATED APPLICATIONS

This application is a continuation of U.S. patent application Ser. No. 17/033,178 to Bevirt et al., filed Sep. 25, 2020, which claims the benefit of U.S. Provisional Application No. 62/906,407, filed 26 Sep. 2019, which are incorporated in their entirety by this reference.

TECHNICAL FIELD

This invention relates generally to the aviation technology field, and more specifically to a new and useful three-dimensional extension linkage in the aviation technology field.

BACKGROUND

Load-bearing linkages for extension and retraction find applications in a wide range of contexts. In particular, aviation technology includes a number of control surfaces that are actuated while bearing substantial aerodynamic loads. For example, flaps require actuation between extended and retracted configurations during flight of many aircraft. However, in many configurations (e.g., swept wing configurations), the flaps must extend in both spanwise and chordwise directions to achieve the desired efficiency, requiring complex actuation along multiple axes simultaneously (e.g., using tracked actuators). Alternatively, a simple actuation can be used (e.g., a single point of rotation) while sacrificing the efficiency of swept wings and/or spanwise and chordwise extension. In sum, conventional approaches suffer from various deficiencies.

Thus, there is a need in the aviation technology field to create a new and useful three-dimensional extension linkage. This invention provides such a new and useful linkage and method of design.

BRIEF DESCRIPTION OF THE FIGURES

FIG. 13 is a side view schematic representation of an example of a spiral rotation.

FIGS. 14A and 14B are top view schematic representations of a first and second example of a spiral rotation, respectively.

FIG. 26 is a top view schematic representation of a variant of the linkage.

FIG. 27A is an isometric view schematic representation of an example of a 3D spiral trajectory.

FIG. 27B is a schematic representation of an example arm pose.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figures 1A, 1B:
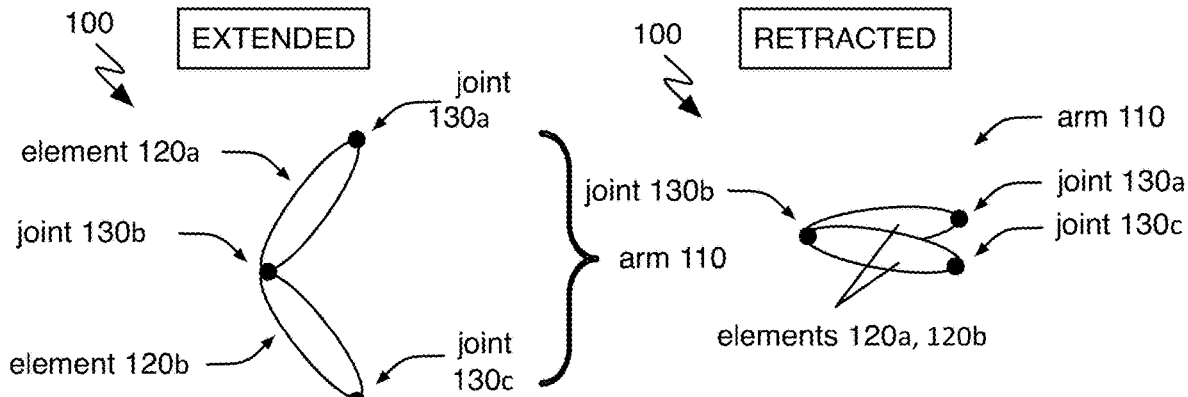
FIG. 1A depicts a schematic diagram of a three-dimensional (3D) extension linkage in the extended configuration.
FIG. 1B depicts a schematic diagram of a three-dimensional (3D) extension linkage in the retracted configuration.

As shown in FIGS. 1A-B, the 3D extension linkage 100 includes at least one arm 110 that includes two elements 120 connected by a joint 130. The linkage 100 can optionally include an actuation mechanism 170, additional arms and/or each arm can include more than two elements, tie rods 140 and/or cross pieces connecting two or more arms, and any other suitable components.

The linkage 100 functions to translate and/or rotate a body attached to one end of the arm relative to a primary structure 150 attached to a second end of the arm. The linkage 100 can also function to bear load through the body to the primary structure. The linkage 100 can also function to transition between an extended configuration (e.g., as shown in FIG. 1A) and a retracted configuration (e.g., as shown in FIG. 1B). The linkage 100 can additionally or alternatively have any other suitable function.

Figure 20:
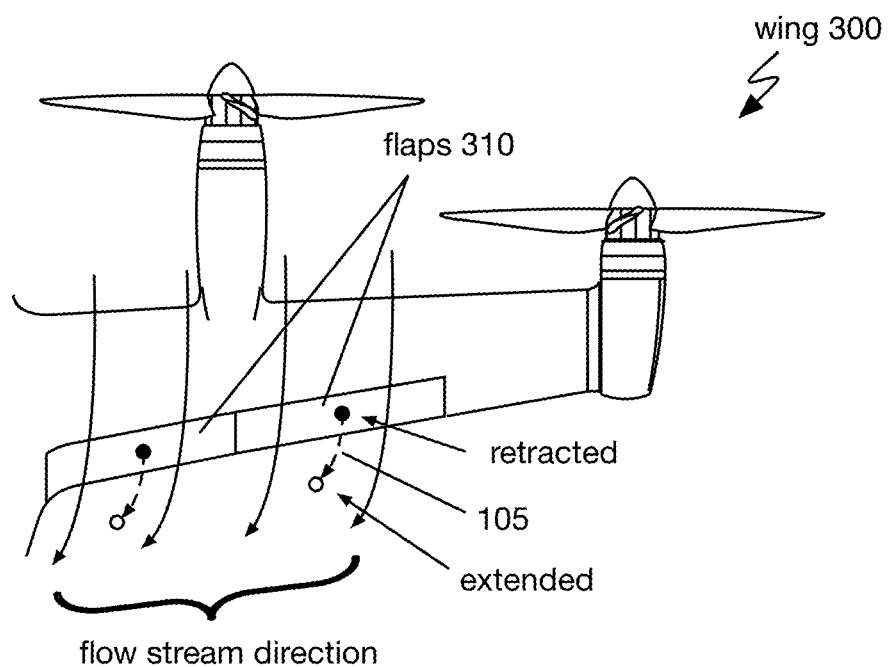
FIG. 20 is a top view representation of an example spiral trajectory relative to a flow stream direction.
Figure 21:
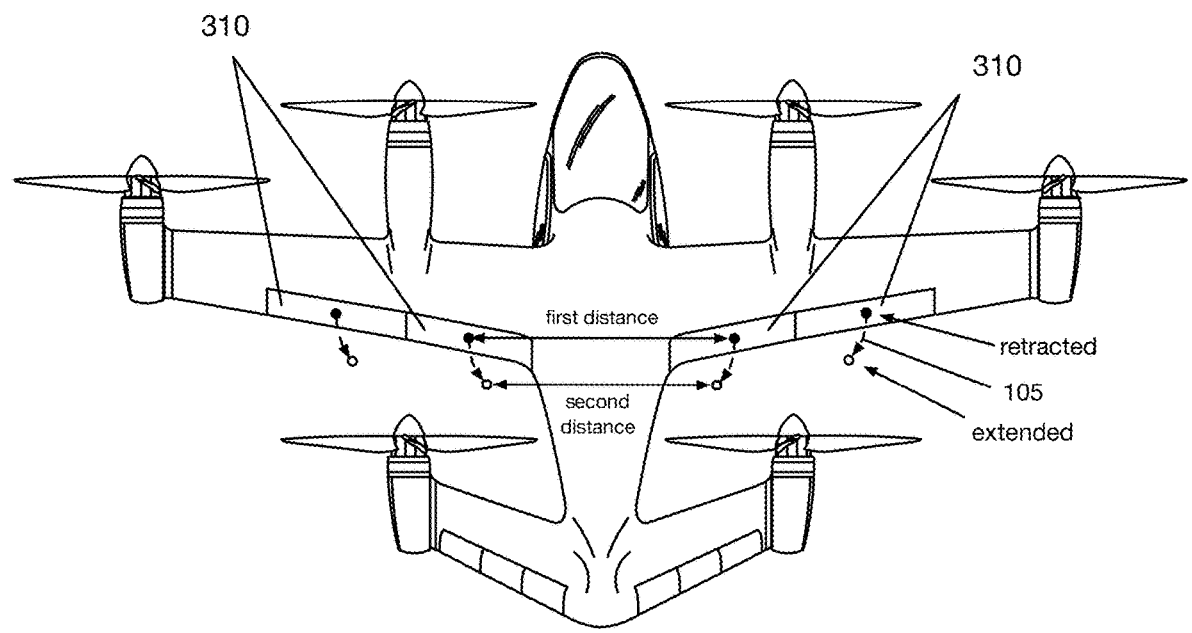
FIG. 21 is a top view of an aircraft illustrating a spiral trajectory of example wing flaps between a retracted configuration and an extended configuration.
Figure 22:
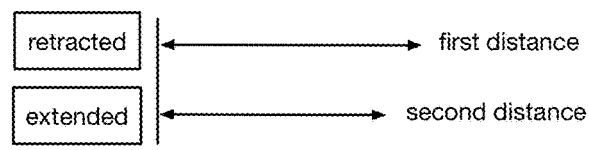
FIG. 22 illustrates example of the distances between the wing flaps of FIG. 21 in the retracted and extended configurations.
Figure 23A:
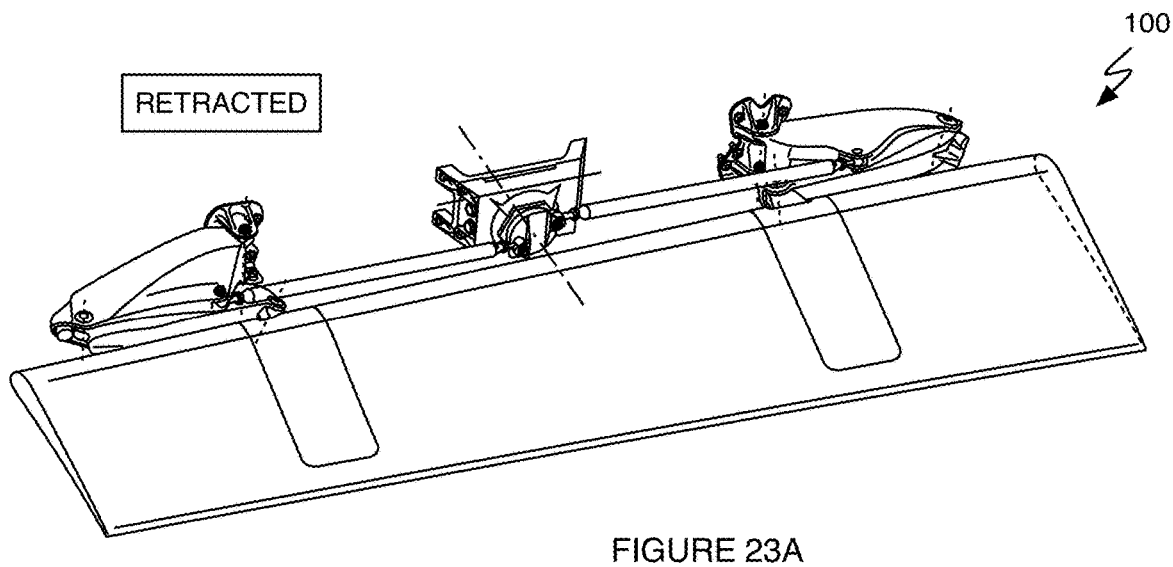
FIGS. 23A and 23B are isometric views of an example linkage in the retracted and extended configurations, respectively.
Figure 23B:
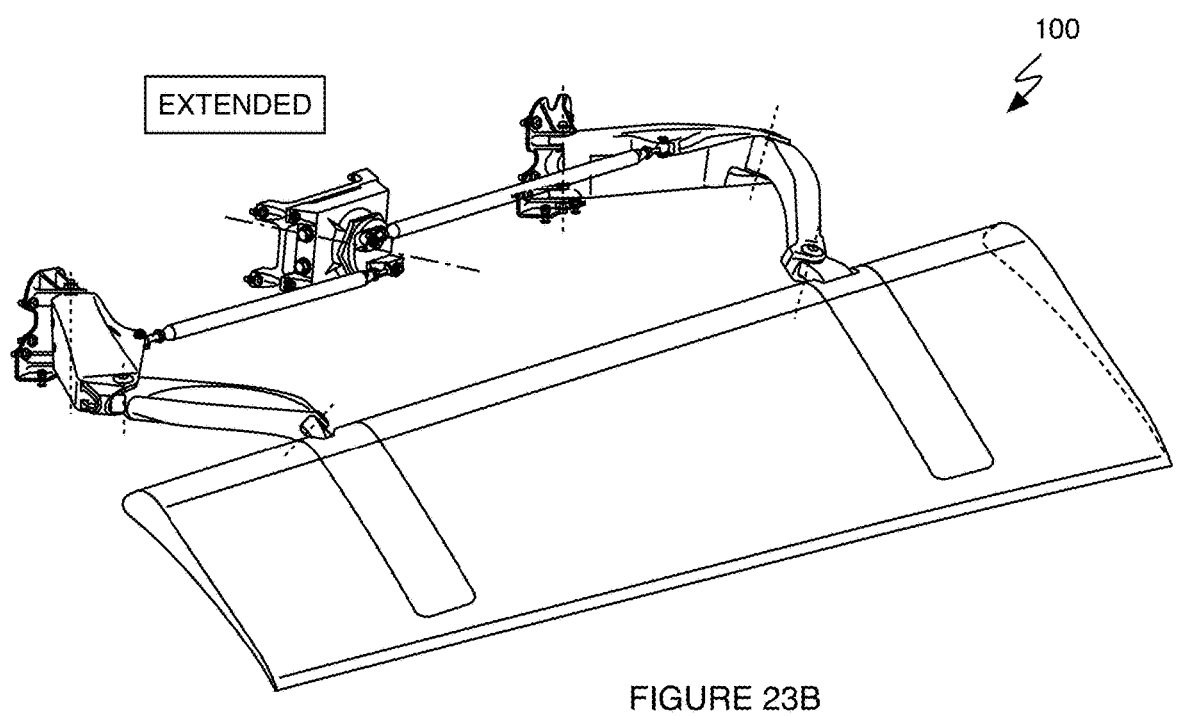

The linkage 100 is preferably configured to position a terminal (distal) linkage end at any point along a trajectory 105 between an extended configuration and a retracted configuration. For example, the linkage 100 can be used to position the wing flaps 310 of an aircraft mounted to the terminal end of the linkage at any degree of extension between fully extended and fully retracted, dependent upon the desired lift characteristics of the wing 300 (e.g., as commanded by a pilot, an autonomous agent controlling the aircraft, etc.). Each point along the trajectory and/or degree of extension of the linkage can be associated with a unique pose of a displaced body 160 and/or attachment joint at a distal end of the linkage (e.g., mounting the displaced body). The pose associated with each point along the trajectory can include any suitable degree of translation and/or rotation. In a first variant, the extended configuration can define a 40 degree rotation of the displaced body about a spanwise axis of the displaced body and/or a 40 degree 3D spiral rotation about the spanwise axis of the displaced body. In a second variant, the position of the terminal end of the linkage in the extended configuration can be between 0.6 chord lengths (e.g., of an aerodynamic body, of the wing flap) and 1.2 chord lengths rearward of the position in the retracted configuration. In a third variant, the position of the terminal end of the linkage in the extended configuration can be shifted or translated laterally (e.g., in a spanwise direction) relative to the retracted configuration. For swept wings, it can be aerodynamically beneficial to translate wing flaps towards the portion of the wing which is rearward on the aircraft (e.g., inboard translation for forward swept wings, outboard translation for rear swept wings) during deployment. Accordingly, in a specific example a wing flap can be displaced laterally and/or in a spanwise direction by a predetermined distance (e.g., 10 cm, more than 5 cm, more than a manufacturing tolerance, etc.) along the trajectory of the linkage during deployment. In a second specific example, a distance between wing flaps (e.g., where the position of a flap is defined at the center of mass) arranged on opposing wings and/or disposed on opposing sides of an aircraft midplane (e.g., symmetric left/right) changes between the retracted configuration and the extended configuration (an example is shown in FIGS. 21 and 22). In a third specific example, during transformation along the 3D spiral trajectory, the wing flap is displaced substantially in a direction of a flow stream over the wing (an example is shown in FIG. 20). In a third variant, during body translation from the retracted position to the extended position, a point along the distal edge of the body translates: laterally (e.g., by a predetermined distance), downward (e.g., by a second predetermined distance), and away from the mounting surface (e.g., outward by a third predetermined distance) relative to the retracted position.

In relation to the linkage 100, arm elements, the primary structure, and/or the displaced body can be connected by joints. The joints can be of one or more joint types. A first joint type includes a revolute joint 132 (e.g., revolute), which fixes rotation about a single axis 134 (e.g., a hinge axis, revolute joint axis) and constrains relative translation between connected bodies in all translation axes. A second joint type includes a spherical joint 136 (e.g., ball joint), which constrains relative translation between connected bodies in all translation axes and does not constrain the connected bodies in relative rotation. In both types of joint, the constraints or lack thereof are considered to be valid to within the mechanical threshold of the physical joint structure (e.g., range of travel of the joint). However, other joint types (e.g., prismatic joints) can be used.

In variations, the linkage can include spherical and/or revolute joints connecting members (e.g., arms, elements, primary structure, and the displaced body), and the combination of spherical and/or revolute joints can be determined by the preference to constrain the motion of the displaced body to at least a single degree of freedom along the preferred trajectory, reduced from the six degrees of freedom available to a rigid body in free space. In additional or alternative examples, the linkage can include joints that do not permit relative movement (e.g., fixed welds that constrain all six degrees of relative motion) outside of flexibility in the elements. However, any other suitable joint type in any other suitable orientation can be used to connect any other suitable combination (e.g., pair) of arm elements.

The linkage can additionally or alternatively be configured to over-constrain the motion of the displaced body, which in practice can account for additional degrees of freedom due to flexibility of the real-world components (e.g., due to the non-rigid real-world dynamics of the linked entities). For any two element arm of the linkage, the two elements add 12 degrees of freedom into the mechanism, and each revolute joint removes five degrees of freedom; thus, an arm that ends in a revolute joint removes three degrees of freedom from the overall system (e.g., three revolute joints in a two element arm removing 15 degrees of freedom after adding 12 from the rigid bodies of the two arms) and an arm that ends in a spherical joint removes one degree of freedom.

The linkage can be used in conjunction with and/or include several related systems, in various embodiments. Such related systems can include an aircraft, aircraft subsystems (e.g., control surfaces, flaps, powertrain subsystems, propulsion subsystems, avionics subsystems, etc.), a ground-based vehicle (e.g., an automotive, a locomotive, etc.), and/or any other suitable systems.

The linkage 100 can be implemented in conjunction with an aircraft, and in particular for extending and retracting the flaps of a wing of the aircraft. In particular, the aircraft is preferably a tiltrotor aircraft with a plurality of aircraft propulsion systems (e.g., rotor assemblies, rotor systems, etc.), operable between a forward arrangement and a hover arrangement. However, the aircraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), and/or any other suitable aircraft or rotorcraft or vehicle propelled by rotors (and/or propellers). The aircraft preferably includes an all-electric powertrain (e.g., battery powered electric motors) to drive the one or more propulsion assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain. The aircraft can additionally or alternatively be any suitable aircraft.

The term "rotor" as utilized herein, in relation to systems related to the linkage 100 (e.g., a tiltrotor aircraft), or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

In a specific example of the linkage, the linkage is integrated into an electric tiltrotor aircraft including a plurality of tiltable rotor assemblies (e.g., six tiltable rotor assemblies). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially tilted state). The control system of the electric tiltrotor aircraft in this example can function to command and control the plurality of tiltable rotor assemblies within and/or between the fixed wing arrangement (e.g., forward flight configuration) and the rotary-wing arrangement (e.g., hover configuration).

In variants, system can be implemented in conjunction with the aircraft configuration described in U.S. application Ser. No. 16/409,653, filed 10 May 2019, which is incorporated in its entirety by this reference.

The term "spiral" (or "three-dimensional spiral") can refer to any suitable 3D curve winding in a continuous and uniformly widening, uniformly tightening, or constant radius (e.g., helix) curve, either around a central point on a flat plane or about an axis so as to form a cone (e.g., volute/conic spring shape) or helix. In a specific example, spiral translation refers to a constant radius path following a uniform angular rotation rate and axial translation rate about an axis (e.g., helical path along the surface of a cylinder about the axis). In a second example, a helix is the locus or path of a point orbiting about a line (e.g., rotation axis, body span axis, wing span axis, etc.) while concurrently translating along the line. The orbiting and translational speeds along the helix can be constant and/or variable (e.g., increasing, decreasing, fluctuating, etc.). However, the term spiral can be otherwise suitably referred to or described, in geometric/mathematic terms or otherwise.

The term "substantially" as utilized herein can mean: exactly, approximately, within a predetermined threshold or tolerance, and/or have any other suitable meaning. In a specific example: "substantially vertical" can mean having a zenith angle larger than an elevation angle, having a polar angle of less than: 30 degrees, 10 degrees, 5 degrees, 0 (exactly vertical), and/or any other appropriate meaning. In a second example, the linkage can follow a substantially spiral trajectory, such as within a threshold deviation of a spiral trajectory (e.g., within 10% of the displacement at each point along the trajectory; within 10% of the displacement at a final pose; within 1 mm, 3 mm, 5 mm, 1 cm, etc.).

2. Benefits

Variations of the technology can afford several benefits and/or advantages.

First, variations of the technology achieve both rotation about an axis and translation along an axis in three-dimensional space simultaneously using a single linkage. This reduces the part count and complexity of the linkage for a given extension task, and can thereby reduce the mass required for the linkage (e.g., versus a linkage with a higher part count or multiple 2D linkages to achieve the same extension task) and enhance reliability (e.g., having fewer parts to maintain and/or control, leading to lower failure rates). However, the system can alternately achieve either rotation or translation, and/or enable any other suitable articulation in three-dimensional space.

Second, variations of the technology can increase the precision and accuracy of the positioning (e.g., displacement) of the body articulated by the linkage toward and from the primary structure. Combining the rotation and translation into a single linkage reduces compounded errors that can arise from actuation of multiple linkages. Additionally, such variations can increase precision and/or accuracy of deployment by leveraging linkage components with a higher rigidity than the displaced body (e.g., for a geometrically over-constrained system under rigid body assumptions) and relying on a deformation in the displaced body to enable repeatable extension of the linkage along the trajectory. In variants designed to deploy a wing flap or other aerodynamic body, increased rigidity in the arm/linkage can reduce deformation of the linkage resulting from varying loads (e.g., aerodynamic loads, variable moment resulting from a changing distance of the weight of the displaced body from mounting point). Variable deformation of the linkage during deployment can displace the flap away from the theoretical trajectory (e.g., as calculated assuming rigid bodies and perfect joints, etc.)—this can result in the occurrence of a gap between the wing skin and the flap at various stages of deployment, wherein the size of the gap can be proportional to the displacement of the wing from the ideal trajectory. In a first example, a change in a gap size between the trailing edge of the wing and the upper surface of the wing flap can be minimized. The size of this gap can be prescribed (or predetermined) changes in the gap size can be minimized and/or eliminated by increasing the rigidity of the linkage. Accordingly, minimizing changes in gap size on the wing exterior (particularly in a retracted configuration of the flap/linkage) can improve aerodynamic efficiency. In variants, the linkage (and/or arms therein) can deform during extension, such as by less than a predetermined threshold amount (e.g., displacement of 1 mm, 2 mm, 5 mm, etc.; measured from the end distal the primary structure) and/or within an range of deformation (e.g., displacement between 0 cm and 1 cm, between 1 mm and 5 mm, between 2 mm and 3 mm, etc.). In a specific example, the linkage is overconstrained (e.g., under rigid body assumptions) and the arms and the displaced body cooperatively deform along the trajectory. Alternately, the linkage can be substantially non-deformable and/or otherwise deform. However, the system can enable any other suitable positioning of the body articulated by the linkage with any suitable precision and/or accuracy.

Third, variations of the technology applied to flap extension enable revolute joint axes of the linkage to be aligned substantially vertically (e.g., versus substantially spanwise-aligned revolute axes in most conventional flap actuators). In a specific example, one or more revolute joints (e.g., each, a majority, etc.) of the linkage can define a revolute axis having a zenith angle (a.k.a. polar angle) larger than an elevation angle (e.g., complement of the zenith angle; relative to a spanwise-chordwise plane; relative to a lateral-longitudinal plane; etc.). The substantially vertical axes enable the linkage to carry lift forces from the flap more effectively than spanwise axes. Additionally, substantially vertical axes can rely on the structure/joints of the linkage to react a greater proportion (e.g., entirety) of the aerodynamic load on the displaced body, rather than transmitting the force directly to the actuation mechanism and/or actuator. Accordingly, the actuation mechanism can utilize a smaller actuator and/or decrease size/weight. However, the axes of various joints of the linkage can be oriented in any suitable direction(s).

Fourth, variations of the technology applied to flap extension enable the flap to be deployed both spanwise and chordwise from a swept wing (e.g., translating away from and along the root-to-tip direction of the wing, as shown by example in FIGS. 3-7), which enables more efficient lift generation than if the flap extended solely in the chordwise direction (and/or downwards) away from the wing. More efficient lift generation further provides benefits to the acoustic performance of the aircraft by enabling more lift to be generated at a lower speed, and the aircraft generates less noise at lower speeds. However, the flap can be deployed along any suitable trajectory.

Figure 3:
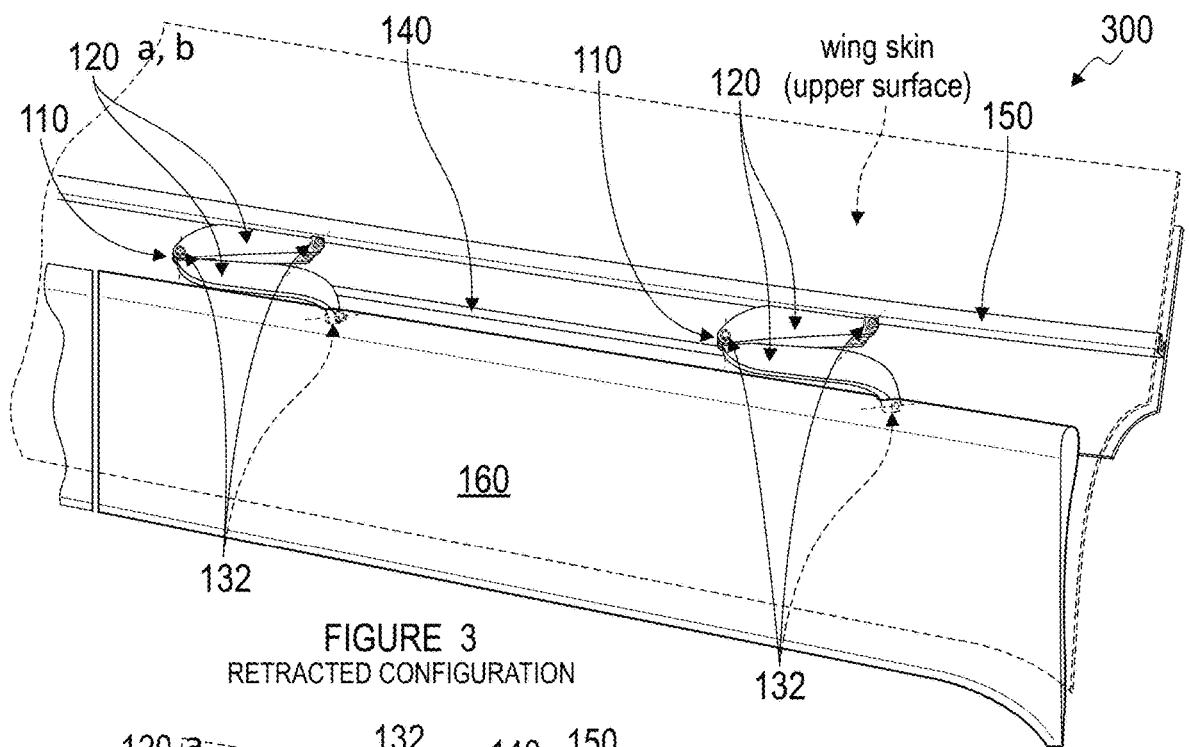
FIG. 3 depicts a top view of an example embodiment of a 3D extension linkage in the retracted configuration.
Figure 7:
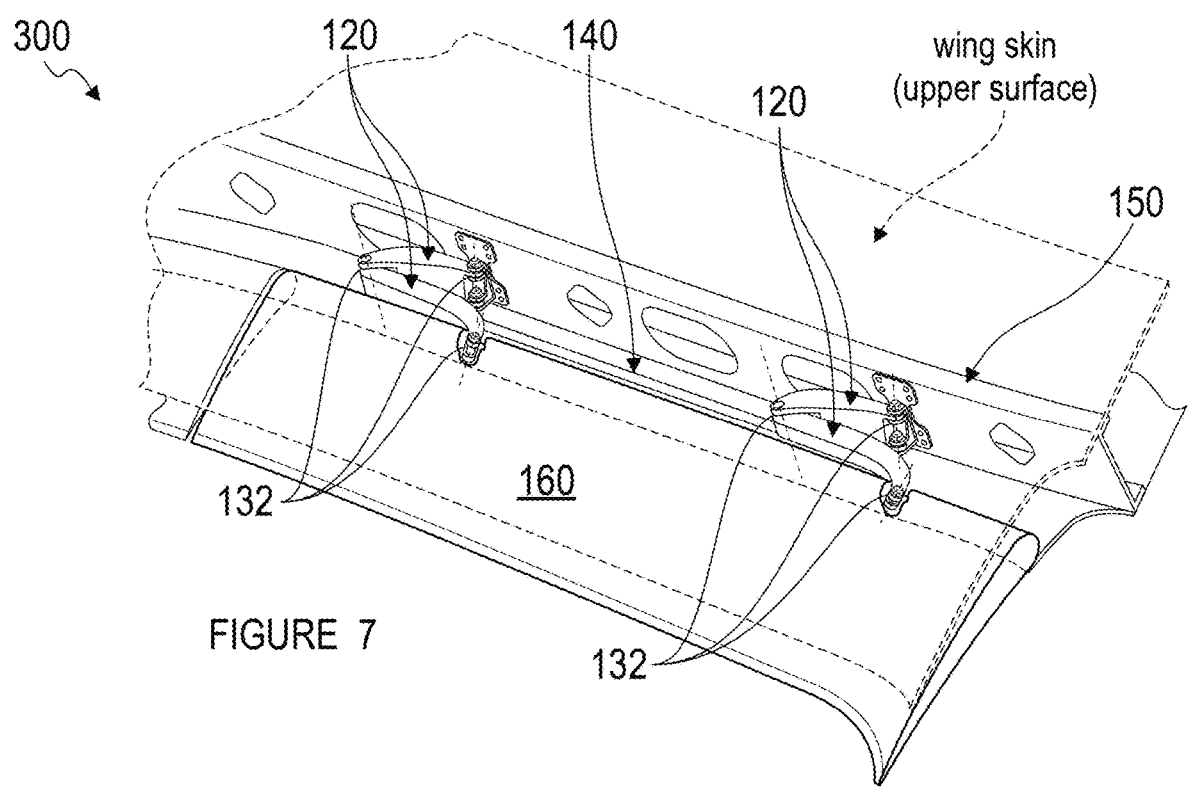
FIG. 7 depicts a top perspective view of the example embodiment of the 3D extension linkage of FIGS. 3-6 in the retracted configuration.

Fifth, variations of the technology enable complex articulation, including both rotation and translation, in space-constrained contexts due to the compact footprint of the linkage in the retracted configuration (e.g., as shown in FIGS. 1B, 3, and 7). However, the system can enable any other suitable articulation given any suitable set of spatial constraints.

Sixth, variations of the technology improve aerodynamic efficiency (e.g., by reducing drag, by reducing weight, etc.) by stowing completely within the wetted outer surface (e.g., skin) of a vehicle (e.g., aircraft) when in the retracted configuration (e.g., in contrast to conventional flap extension and retraction mechanisms that utilize external tracks that protrude into the freestream, often shrouded by a faring, irrespective of the flap configuration). However, the system can otherwise improve aerodynamic efficiency and/or otherwise suitable stow/nest in the retracted configuration.

Seventh, variations of the technology can be utilized in any context that includes extension and retraction (e.g., robotic manipulation, industrial equipment, etc.), and shall not be understood to be useful only in relation to aeronautical systems.

However, variations of the system can additionally or alternatively provide any other suitable benefits and/or advantages.

3. System

As shown in FIGS. 1A-B, the 3D extension linkage 100 includes at least one arm that includes two arm elements connected by a joint. The linkage 100 can optionally include an actuation mechanism, additional arms and/or each arm can include more than two elements, tie rods and/or mechanical connector linking two or more arms, and any other suitable components.

The linkage 100 functions to translate and/or rotate a body attached to one end of the arm relative to a primary structure attached to a second end of the arm. The linkage 100 can also function to bear load through the body to the primary structure. The linkage 100 can also function to transition between an extended configuration (e.g., as shown in FIG. 1A) and a retracted configuration (e.g., as shown in FIG. 1B). The linkage 100 can additionally or alternatively have any other suitable function.

Any suitable displaced body can be attached to the arm(s) of the linkage and/or can configured to be displaced by the linkage. The body is preferably an aerodynamic body which functions to change the aerodynamic forces and/or moments on the vehicle/aircraft, such as a wing flap, rudder, elevator, spoiler, rear wing (e.g., on a ground vehicle), air brake, and/or any other suitable aerodynamic body. The body can be rigid (or assumed to be rigid for various calculations) or flexible/deformable. The body preferably exhibits fully elastic deformation (no inelastic deformation) within a regime between the extended and retracted positions and/or along the trajectory between the extended and retracted configurations of the linkage, but can be otherwise configured. The body can be a stressed skin body, monocoque, rigid (or semi-rigid) frame with a non-loaded covering, and/or include any other suitable construction. However, the system can include and/or be configured to transform any other suitable body.

The displaced body is preferably connected to and/or supported by the linkage at the joint(s) at the distal (e.g., rearward) end of each arm. The linkage can mount the displaced body to the primary structure in any suitable manner. Preferably, the linkage connects to the primary structure at a mount (e.g., wing mount) fixed to the primary structure and rotatably connected to the joint at the proximal (e.g., forward) end of each arm (e.g., rotatable about a revolute axis, hinged, etc.). In a specific variant, the linkage can mount the displaced body to a wing. The linkage is preferably connected to an interior of the wing, wing spar, or other support structure of the wing, but can be otherwise suitably configured.

The displaced body can be located on a wing and connected to the wing by the linkage mechanism. The displaced body is preferably located on an inboard portion of the wing, be configurable between multiple spanwise positions on the wing (e.g., change spanwise position along the spiral axis based on the extension/retraction of the linkage), and/or have any suitable spanwise position on the wing (in any suitable configuration). The displaced body can be located below an upper surface of the wing, inside a volume of the wing (e.g., in the retracted configuration), form a portion of a fluid exterior of the wing (e.g., portion of the lower surface), above the wing, below the wing, be configurable between multiple vertical positions (e.g., translate vertically based on the extension/retraction of the linkage) and/or have any other suitable vertical position relative to the wing. The displaced body can be located below a trailing edge of the wing, on a rear portion of the wing, overlap a portion of the wing in a chordwise position (e.g., in the retracted configuration, extended configuration, and/or any degree of extension therebetween), and/or have any other suitable position relative to the wing. In a specific variant, a first and second instance of the displaced body can be symmetric about a sagittal plane (e.g., vertical-longitudinal plane) of the aircraft. In a specific example, a distance between the first and second instance of the displaced body changes (e.g., increases-such as for rear-swept wings, decreases—such as for forward-swept wings, etc.) between the extended and retracted configurations.

The linkage 100 is preferably a physical mechanical structure operable between a first position (associated with an initial pose of the displaced body, associated with the retracted position) and a second position (associated with a final pose of the displaced body, associated with the extended position). The linkage 100 can dynamically follow a trajectory connecting the first position to the second position, wherein the trajectory can parametrized (e.g., estimated or according to the calculations below), approximated, arbitrary, or otherwise determined and/or constrained.

In variants transforming an aerodynamic body (e.g., wherein the aerodynamic body is the displaced body), the initial pose of the aerodynamic body at the first position of the linkage (e.g., in the retracted configuration) is fully contained within an interior of a wing. Alternately, the aerodynamic body can form a portion of the wing exterior (e.g., on a lower surface of the wing), and/or have any other suitable initial pose. In the initial pose, the aerodynamic body can define any suitable gap width (e.g., in a chordwise direction; <3 mm, <5 mm, <10 mm, etc.) relative to a skin of the wing—such as required for clearance during transformation and/or deformation under variable aerodynamic load. In a specific example, a collective rigidity of the mechanical structure of the linkage is specified to ensure required gap width of less than a predetermined threshold dimension (e.g., under a maximum deformation, under bounding load case, etc.). In a second specific example, the gaps width is less than 1% of the chord length of the displaced aerodynamic body. However, the body can be provided at any other suitable initial pose and/or at any other suitable pose in the retracted configuration.

Figure 25A:
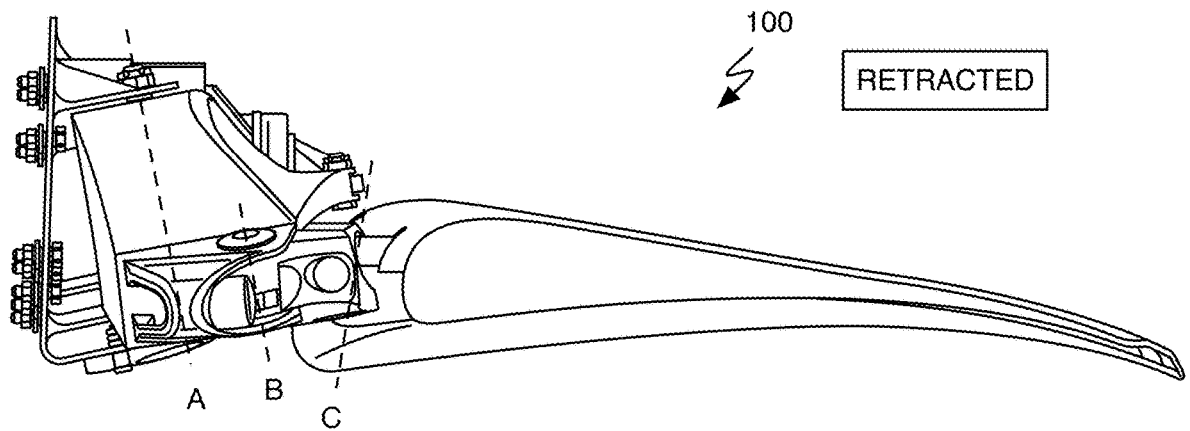
FIGS. 25A and 25B are side view of an example linkage in the retracted and extended configurations, respectively.
Figure 25B:
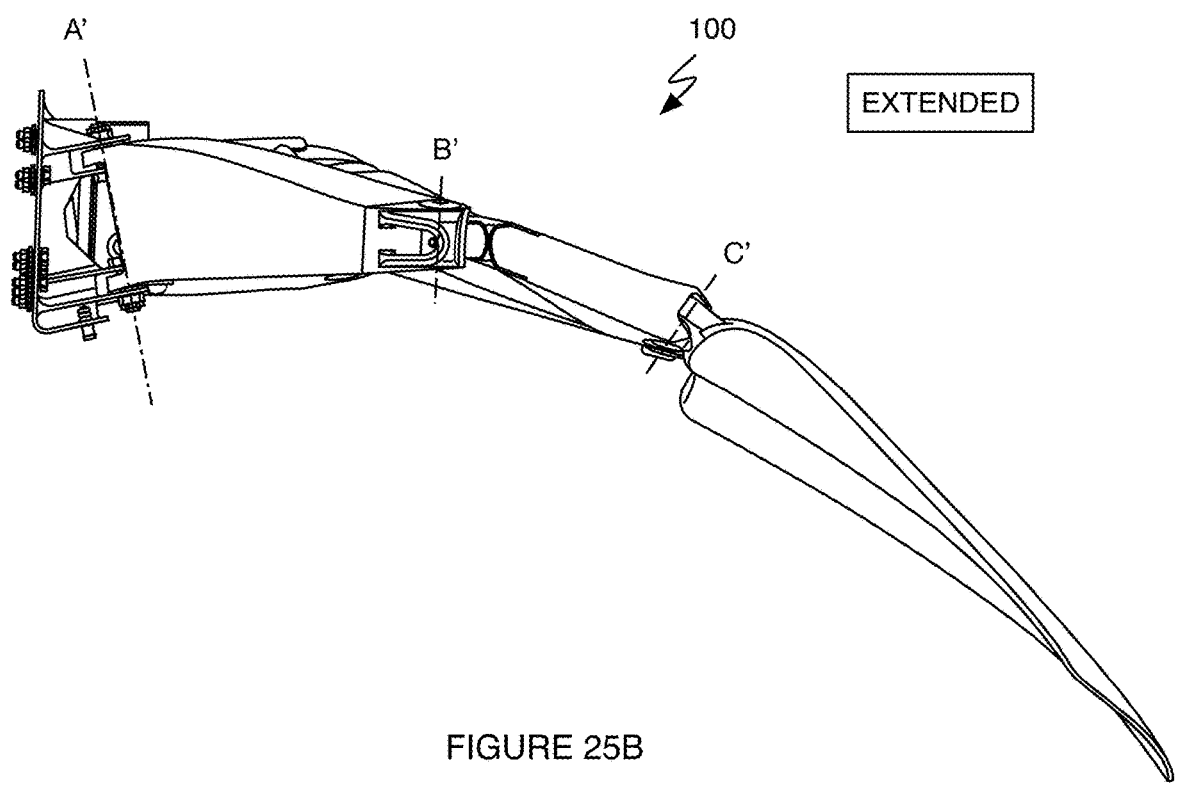
Figure 25C:
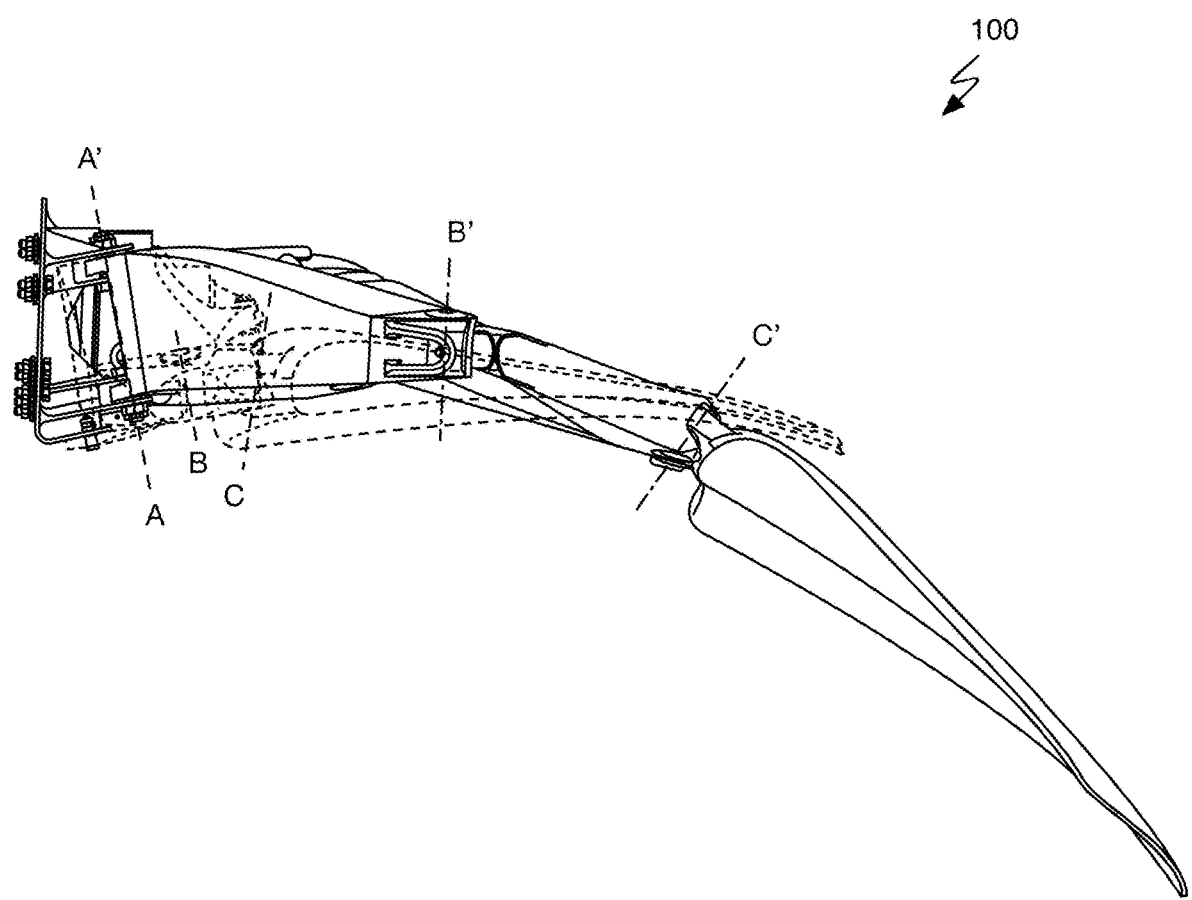
FIG. 25C is an example linkage in the extended configuration and illustrates a transformation between the retracted and extended configurations.

In variants transforming an aerodynamic body, the final pose of the aerodynamic body at the second position of the linkage (e.g., in the extended configuration) can define any suitable translation and/or rotation relative to the primary structure (e.g., wing). The final pose of the aerodynamic body can include a spanwise translation relative to the initial pose, such as a spanwise translation of about 10 cm (exactly 10 cm, 5-15 cm, etc.), a spanwise translation greater than a threshold proportion of the chord length of the aerodynamic body (e.g., 20% of the chord length, 50% of the chord length, etc.), and/or any other suitable spanwise translation relative to the initial pose. The final pose can additionally include a vertical displacement 230 and/or longitudinal displacement 220 (e.g., rearward) relative to the initial pose. An example is shown in FIG. 13. In variants, the combined vertical/longitudinal translation and rotation of the body can be parameterized as a three-dimensional (3D) spiral rotation 210 about a spiral axis 200, and the spanwise displacement 240 (or spanwise translation) can be parameterized as a shift along of the spiral axis. Examples are shown in FIGS. 14A and 14B. The change in angle of attack of the aerodynamic body between the initial pose and final pose (e.g., rotation about a spanwise axis of the aerodynamic body, body rotation 250 relative to the wing, etc.) can be equal to the magnitude of the 3D spiral rotation and/or different from the 3D spiral rotation. An example is shown in FIGS. 25A and 25B. Each arm's trajectory (and/or trajectory of the arm end, distal the arm's mounting point) is preferably constrained to trace a portion of a 3D spiral during translation. The 3D spiral preferably rotates about a lateral (or spanwise) axis of the arm, wing, or displaced body, but can alternatively rotate about a vertical axis, longitudinal axis, or other suitably oriented axis. The 3D spiral can wind clockwise, counter-clockwise, or in any other suitable direction. The 3D spiral's pitch is preferably on the order of inches, but can be on the order of feet or meters. Different arms attached to the same displaced body can trace the same or different trajectory throughout displacement.

In a first example, the 3D spiral can be helical (or substantially helical), having uniform radius (or substantially uniform radius) about the spiral axis.

In a second example wherein the displaced body is an aerodynamic body, a first distance between the first position and the second position along the 3D spiral trajectory is approximately equal to a chord length (e.g., within 25%, within 10%, within 5%, etc.) of the aerodynamic body and a second distance between a first revolute origin (e.g., connecting the arm to the primary structure) and a second revolute origin (e.g., connecting two elements of the arm) is greater than half the first distance and less than the first distance.

The arm(s) of the linkage preferably function to constrain the body at the initial pose and final pose, can define any suitable trajectory therebetween.

In one variation, the dynamic motion of the linkage can be closely approximated by an arbitrary parametrized trajectory defined as the combined translation and rotation of the body (e.g., the body which is extended and retracted from the primary structure by the linkage; assumed for this calculation to be rigid) in space expressed using a translation vector $x_0$ and rotation matrix $\underline{R}$ such that a point on the body initially positioned at r in some fixed coordinate system is moved to $$r'=r_0+x_0+\underline{R}(r-r_0),$$

where $r_0$ is an arbitrary origin of such a rotation and $x_0$ is the shift of this arbitrary origin. A rotation such as this can be expressed in terms of an axis of rotation direction unit vector a, $|a|=1$, and a corresponding angle of rotation $\varphi$, $$\underline{R}=\underline{R}(a,\varphi).$$

The choice of a and $\varphi$ for any non-identity rotation matrix $\underline{R}\neq\underline{I}$ is unique except for the transformations $$\underline{R}(a,\varphi)=\underline{R}(-a,-\varphi)=\underline{R}(a,\varphi+2\pi k),$$

where k is an arbitrary integer. Given a rotation $\underline{R}(a, \varphi)\neq\underline{I}$, the origin $\tilde{r}_0$ of this rotation can be found such that the translation vector $x_0=\sigma a$ has only a component $\sigma$ along the direction of the axis a. Any suitable rigid body displacement (e.g., translation and rotation) can be expressed as a 3D spiral rotation with an angle $\varphi$ about the axis a with axis origin $\tilde{r}_0$, and a displacement $\sigma$ along a. Thus the trajectory definition associated with a physical linkage can be expressed as $$r'=\tilde{r}_0+\sigma a+\underline{R}(a,\varphi)(r-\tilde{r}_0) \qquad (1)$$

Note that the origin $\tilde{r}_0$ is not uniquely defined and has an arbitrary component along the axis direction, as the choice $\tilde{r}_0'=\tilde{r}_0+\lambda a$ still defines the same 3D spiral trajectory as desired. Thus, the linkage 100 can be configured to extend and retract the displaced body (e.g., a flap of the aircraft) along (or approximately along) a spiral axis rotation and translation using a minimal number of elements (e.g., arm elements) and connections while satisfying other mechanical and design constraints (e.g., compactness, stiffness, nominal load factor, etc.). For example, as shown in FIGS.

Figure 6:
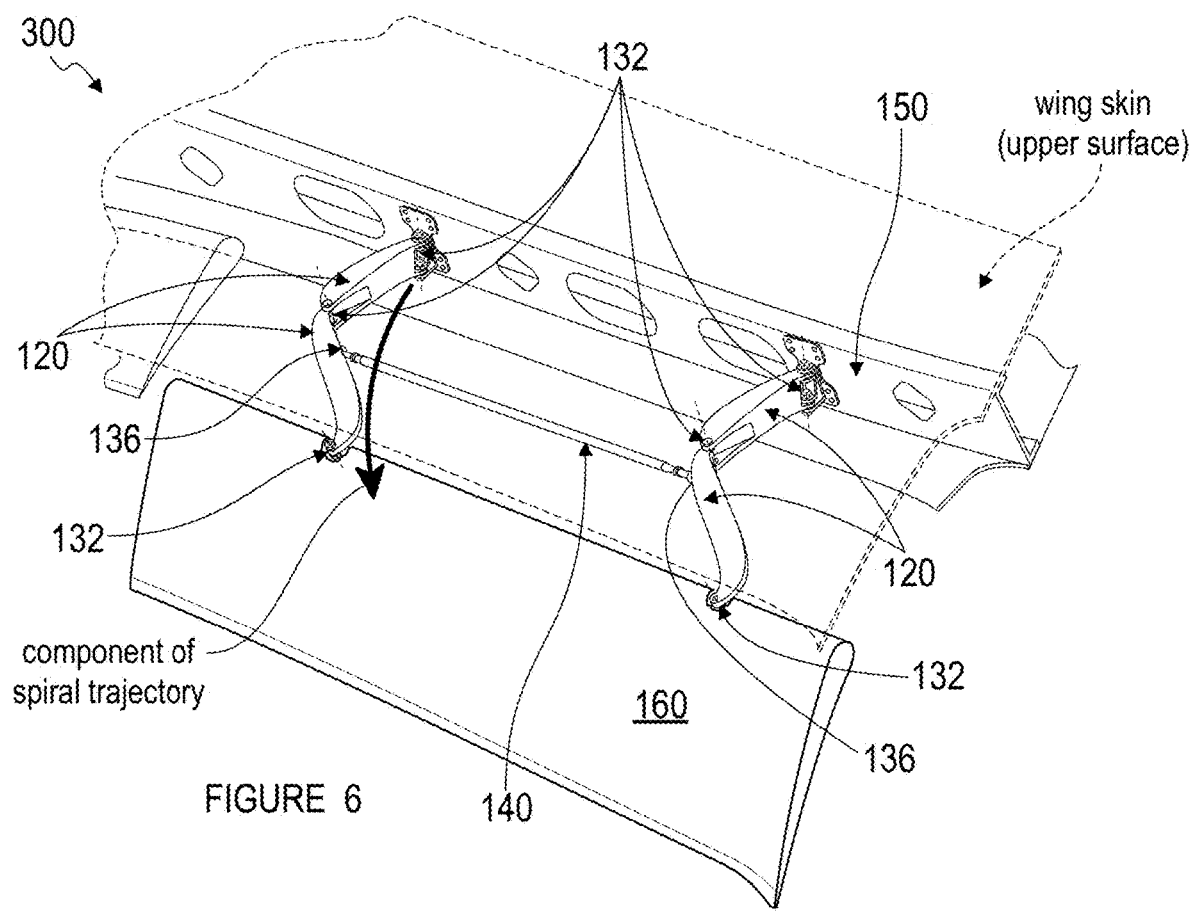
FIG. 6 depicts a top perspective view of the example embodiment of the 3D extension linkage of FIGS. 3-5 in the extended configuration.

6 and 7, the displaced body (e.g., flap) translates away from the wing while rotating downwards and away from the wing in transitioning between the retracted configuration (e.g., FIG. 7) and the extended configuration (e.g., FIG. 6).

As an example: a 3D spiral trajectory can be defined for a rigid body transformation between any arbitrary initial position and final position according to Expression (1).

An example of a 3D spiral trajectory about defined by a transformation from r to r' is illustrated in FIG. 27A.

Figure 15:
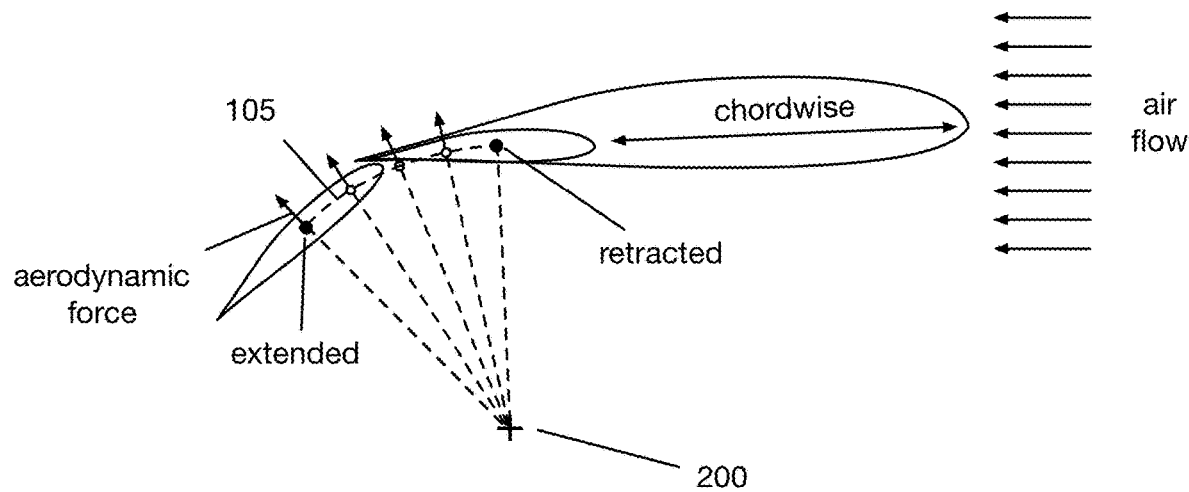
FIG. 15 is a side view schematic representation of an example of a spiral rotation.

In variations, it can be particularly beneficial for the trajectory of the aerodynamic body between the initial and final pose to be a 3D spiral path (or substantially follow a 3D spiral path) because the resulting aerodynamic force generated by the body will be substantially radial about a common axis at each liminal position along the trajectory (an example is shown in FIG. 15)—which minimizes the actuation force required to transform the body along the trajectory within a given airflow. However, the trajectory can be: linear, curved (e.g., in a plane), or have any other suitable geometry.

In variations of the linkage 100, the linkage includes one or more arms that each include two elements (e.g., rigid members, higher rigidity than displaced body, structural members). The arm(s) of the linkage function to achieve the correct poses of the displaced body along the trajectory. In such variations, the first element of the arm is connected to the primary structure (e.g., the wing structure of an aircraft) with a revolute joint, and the second element is connected to the first element with another revolute joint. The second element (e.g., distal element, aft/rear element, etc.) is connected to the body to be displaced (e.g., the flap of the aircraft) by a joint (e.g., a revolute joint, a spherical joint, rigidly fixed, etc.).

Figure 28:
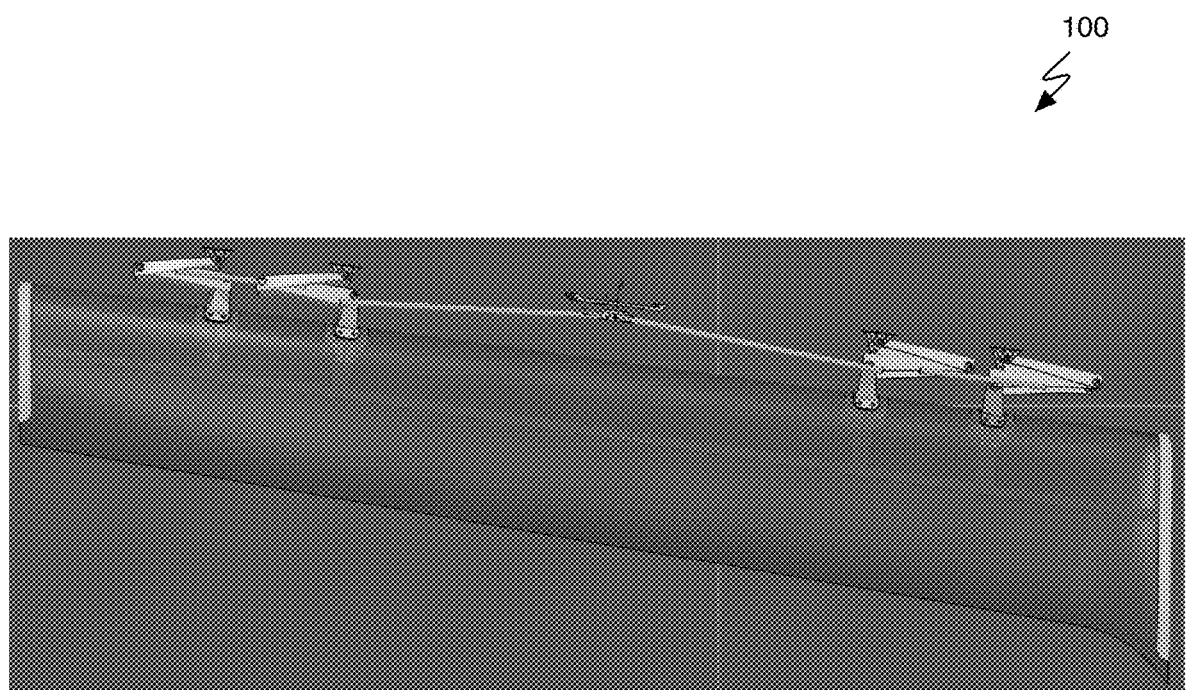
FIG. 28 is an example of a variant of the linkage.

The number of arms and the choice of joint connections can, in variations, be based on the aspect ratio of the displaced body. In a first example, the displaced body can have a span to chord length ratio of about 3:1. In the first example, 2 arms can be connected to the displaced body at spanwise positions of about 25% and 75% along the displaced body's span, respectively. Additionally, the first example can include revolute joints at the distal end of each of the two arms (e.g., connecting the arms to the displaced body). In a second example, the displaced body can have a span to chord length ratio of about 5:1. In the second example, 3 arms can be connected to the displaced body at spanwise positions of about 20%, 50%, and 80% along the span, respectively. At large aspect ratios (e.g., larger than a span to chord length ratio of 1:1), the non-idealities of the displaced body (e.g., flexibility, stiffness, etc.) can increase in salience and in such cases additional mechanical constraints (e.g., reduction in degrees of freedom) can be used. For example, in a two arm configuration as shown in FIGS. 3-7, the linkage can include a tie rod between the inter-element (middle) revolute joints of both arms and both arms can be connected to the displaced body (e.g., flap) by revolute joints, which over-constrains the trajectory by two degrees of freedom in theory (i.e., when stiffness considerations are ignored; when bodies are assumed to be rigid and joints are assumed to be ideal) but provides a preferred level of constraint to the linkage in this specific example. In a specific example, when the displaced body is over-constrained and a collective stiffness of the plurality of arms exceeds a stiffness of the wing flap, the displaced body (e.g., wing flap) is configured to deform during transformation between the retracted configuration and extended configuration. In a third example, two sets of redundant arms (e.g., two sets of two arms, four arms, etc.) can be connected to the displaced body (an example is shown in FIG. 28). In the third example, the two sets of redundant arms can be connected by an inter-set tie rod (e.g., coupling the first set to the second set) extending between the first set and the second set of arms. Each set can include intra-set tie rods, connecting the redundant arms together so that a single actuation mechanism can drive both arms simultaneously. In the third example, the redundant arms within each set establish redundant (and/or parallel) load paths between the primary structure and the displaced body.

Figure 2A:
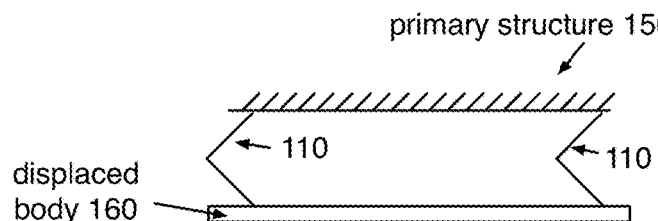
FIG. 2A depicts a schematic diagram of a variation of a 3D extension linkage.
Figure 2B:
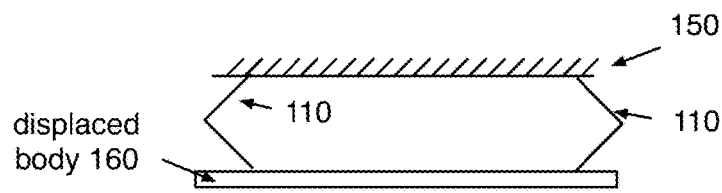
FIG. 2B depicts a schematic diagram of a variation of a 3D extension linkage.
Figure 2C:
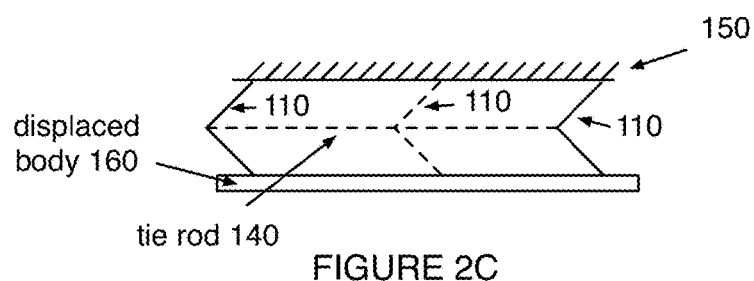
FIG. 2C depicts a schematic diagram of a variation of a 3D extension linkage including a tie rod and a third arm.

The articulation path of multi-element arms can differ while being configured to translate and/or rotate the displaced body along the same (or similar) articulation trajectory, as shown in FIGS. 2A-B. As shown in FIG. 2C, the linkage an additionally or alternatively include additional constraints (e.g., additional arms, tie rods between arms, etc.) while being configured to follow the same articulation trajectory.

Arms of the linkage can have any suitable geometry and/or orientation. Two arms can have the same geometry or a different geometry, the same orientation (e.g., same pose, but shifted along the spiral axis and/or along a span of the wing) or a different orientation (e.g., mirrored orientation, unique joint poses, etc.), the same number of elements or a different number of elements, the same set of joints or a different set of joints (e.g., different order, different combination/permutation of joints, etc.), and/or any other suitable relative characteristics. Preferably, in the retracted configuration the arms of the linkage are geometrically bounded by a span of the displaced body such that the furthest spanwise extent of the linkage (e.g., collectively defined by all of the arms) is smaller than the span of the displaced body. However, the arms can alternately extend beyond the span of the displaced body (e.g., extend into an interior portion of the wing inboard and/or outboard of the wing flap), and/or be otherwise configured. Preferably, the chordwise dimension (relative to the wing chord) of the arms in the retracted configuration is less than 10% of the wing chord length, but can alternately be less than 5% of the wing chord length, substantially equal to the distance between the leading edge of a wing flap and a spar of the wing, and/or any other suitable dimension. In a specific example, the chordwise dimension of the arms in the retracted configuration is between 4 cm and 10 cm. Accordingly, the arms are preferably configured to be fully packaged enclosed by the wing and/or located within the wing interior in the retracted configuration. In the extended configuration, the arms can remain partially or fully within the wing interior, and/or can be exposed to a fluid exterior of the wing. In variants, the geometry of the arms can be aerodynamically streamlined (particularly at a distal element, distal portion, and/or connection to the displaced body) in order to minimize air flow disruption over the wing flap in the extended configuration. However, the arms can have any suitable geometry and/or orientation.

The arms can include arm elements which function to transmit loads between the various ends of the arm. Arm elements can additionally function to define a relative pose of a first joint at a first end of the arm element and a second joint at a second end of the arm element. Arm elements can have any suitable geometry. Along the arm length (e.g., between opposing ends terminating in a joint), the geometry of arm elements can be: straight, tapered, curved/arcuate, twisted (e.g., about arm element's longitudinal axis; clockwise or counterclockwise), and/or have any other suitable geometry. The cross sectional profile of arm elements can be: cylindrical, prismatic, twisted prism, hollow (e.g., tube), solid, airfoil-shaped/streamlined, and/or have any other suitable cross sectional profile. In variants, the base/proximal end of arm elements can be thicker than the distal end (taper towards a distal end), such that the arm is thicker/more rigid where the moment resulting aerodynamic loads is largest. Likewise, the proximal element of the arm can be substantially thicker and/or have a greater cross-sectional area than the distal element. However, arm elements can include any other suitable geometry. Arms can include any suitable number of arm elements. Arms preferably include two arm elements, but can alternately include more than two arm elements (e.g., 3 elements, a tie rod connection, a connection to the actuation mechanism, etc.), and/or any other suitable number of elements.

Additionally, the arm elements can be shaped such that the linkage is maximally compact in the retracted configuration (e.g., such that the elements of a two-element arm can nest together in the retracted configuration as shown in FIGS. 3 and 7). In a specific example, arm elements can be configured to nest together in the retracted configuration, thereby minimize space required and/or maximize the available extension relative to the mounting position on the primary structure (e.g., for material use/length/volume of the linkage). In a specific example, a portion of each element lies at the same chordwise position of the wing. In a second specific example, a portion (e.g., middle portion) of the proximal element overlaps a portion of the distal element. However, the elements can be otherwise not nest, engage by way of a physical stop/bumper (or else impact a physical stop before engaging each other), or be otherwise suitably configured in the retracted configuration.

Figure 4:
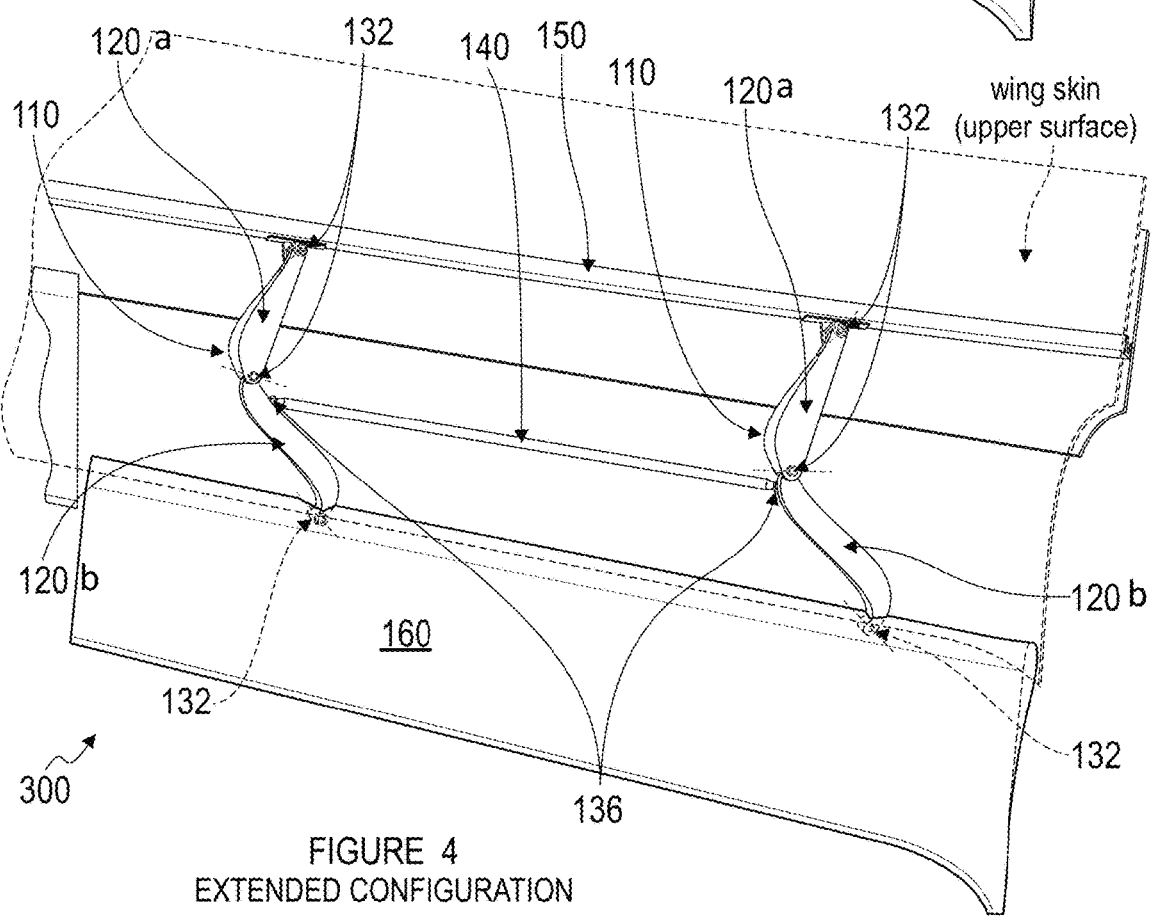
FIG. 4 depicts a top view of the example embodiment of the 3D extension linkage of FIG. 3 in the extended configuration.
Figure 5:
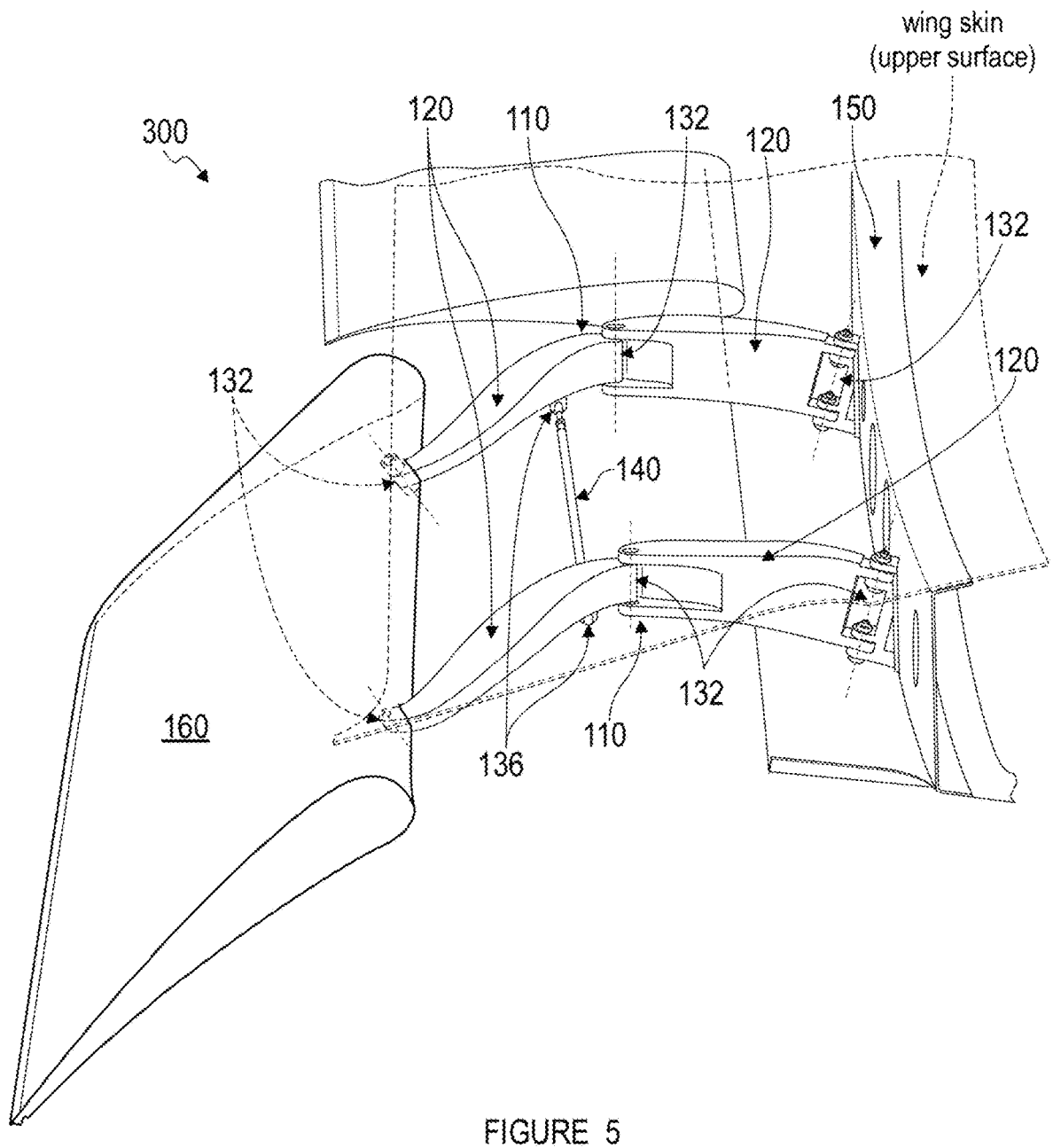
FIG. 5 depicts a side perspective view of the example embodiment of the 3D extension linkage of FIGS. 3 and 4 in the extended configuration.

The elements are also preferably shaped and designed (e.g., by way of choice of material, such as high strength-to-weight ratio metal alloys) to provide the necessary load bearing capacity in relation to forces applied to the displaced body when in the extended configuration (e.g., as shown in FIGS. 4-6). However, the elements can additionally or alternatively have any suitable shape, and/or be constructed out of any suitable materials.

Arms can include any suitable number of joints. Arms can include two joints, three joints, four joints, more than four joints, and/or any other suitable number of joints. In a specific example, multi-element arms with a number of arms (N) include at least N+1 joints. In a second specific example, a two element arm can include a first joint connecting the arm to the primary structure (e.g., a mount on the primary structure), a second joint between/connecting the two arm elements, and a third joint connecting the arm to the displaced body. The arm can additionally include a fourth joint connecting the arm to a tie-rod and/or a fifth joint connecting the arm to an actuator. However, the arm can include any other suitable set of joints and/or arm elements.

The geometry (e.g., length, curvature, twist, etc.) of arm elements and orientation/position of revolute joints can be parameterized according to the articulation trajectory using any suitable set of constraints.

In one variation, revolute joints can be used to constrain arm motion to the trajectory. In a specific example, a revolute joint which connects two bodies (e.g., elements, an element and displaced body or primary structure, etc.) such that the rotated coordinates y' of the second body as expressed in the coordinate frame of the first body can be expressed as $$y' = y_0 + \underline{R}(e,\theta)(y-y_0),$$

where y are the original coordinates of the second body, $y_0$ is the origin of the revolute, and e, |e|=1 is the direction of the revolute axis, all of which are defined in the coordinate frame fixed to the first body. The angle θ is the angle of rotation of the revolute.

If the point p is the initial position of the end point of the second arm in the coordinate frame of the primary structure, then combining the revolving actions of two revolute joints the displacement of the point p can be expressed as $$p' = y_1 + \underline{R}(e_1,\theta_1)(y_2 + \underline{R}(e_2,\theta_2)(p-y_2)-y_1), \quad (2)$$

where $y_{1,2}$ are revolute origins, $e_{1,2}$ are revolute axes, each expressed with respect to the coordinate system of the primary structure, and $\theta_{1,2}$ are the respective revolute rotation angles. This point is also displaced according to the desired displacement of the displaced body, $$p' = \tilde{r}_0 + \sigma a + \underline{R}(a,\varphi)(p-\tilde{r}_0). \quad (3)$$

Equating both expressions for p' thus defines a set of three equations to solve for the geometries of the arms of the linkage with, in such variations, 10 degrees of freedom total. Given that the number of variables exceeds the number of equations, some parameter values can be set based on additional constraints of the application.

In examples wherein the end of the second element of the arm connects to the displaced body with a revolute (e.g., in lieu of a spherical joint, a fixed weld, etc.), the axis $e_3$ and angle of rotation $\theta_3$ of that revolute are consistent with the desired rotation of the displaced body in the final position along the trajectory. The combined rotation about all three revolutes (e.g., product of the rotation matrices for each revolute) can be constrained to satisfy this condition, namely $$\underline{R}(e_1,\theta_1)\underline{R}(e_2,\theta_2)\underline{R}(e_3,\theta_3) = \underline{R}(a,\varphi), \quad (4)$$

which can provide three additional equations to the system of equations, and normalized axis $e_3$ and the angle $\theta_3$ are three additional degrees of freedom to be selected for in the linkage. In a specific example including three revolute joints, a combined rotation of the first, second, and third revolute joints between the retracted and extended configuration matches the angle of attack change of the displaced body (e.g., wing flap).

Accordingly, the arm(s) can be parameterized such that a position/orientation (pose) of each revolute joint cooperatively constrains the body along the trajectory between the retracted configuration and the extended configuration. An example is shown in FIG. 27B.

A length of each element of the arm preferably corresponds to a distance between joints (joint origins) at opposing ends of the element. As the resulting geometry of the arm (e.g., as shown in 27B) respecting the trajectory (e.g., as shown in 27A) can provide a large solution space, the length of each element can optimized according to the requirements of the specific implementation—thereby reducing the solution space. The length of arm elements can optimized according to: an available packaging space, structural rigidity/stiffness, minimizing gaps in the aerodynamic profile, and/or any other suitable characteristics. The resulting length can be constrained such that: a size in the retracted configuration takes of less than a predetermined chordwise distance (relative to the body, relative to the wing), a distance between a furthest spanwise extent of the arms in the retracted configuration is less than a span of the displaced body, a deflection of a distal end of the arm/element is less than a predetermined threshold distance (e.g., gap width, proportional to the gap width, etc.) for a particular element cross-section/material, and/or otherwise suitably constrained. A width of the arm elements can be constrained by a position of ribs/spars within an interior of the wing and/or a retracted position of the body. However, the arm elements can define any other suitable size, length, width, and/or other suitable geometric characteristics. In a specific example, a length of the arm elements is between 40% and 150% of the chord length of the displaced aerodynamic body (or about 1 chord length of the displaced aerodynamic body).

In a first variant, the proximal and distal elements of each arm form a "V-shape," the point of the V occurring at a joint between the proximal and distal elements. In a first example, the plurality of arms comprises an inboard arm and an outboard arm, wherein in the retracted configuration the proximal elements of the inboard and outboard arms are angled inboard and outboard, respectively, wherein the V-shape of the inboard arm broadens away from the point in an outboard direction relative to the wing (and narrows in an inboard direction relative to the wing), wherein the V-shape of the outboard arm broadens in an inboard direction relative to the wing (e.g., < >). In a second example, the V-shape of each arm broadens away from the point in the same direction (e.g., outboard, inboard, etc.).

Figure 24:
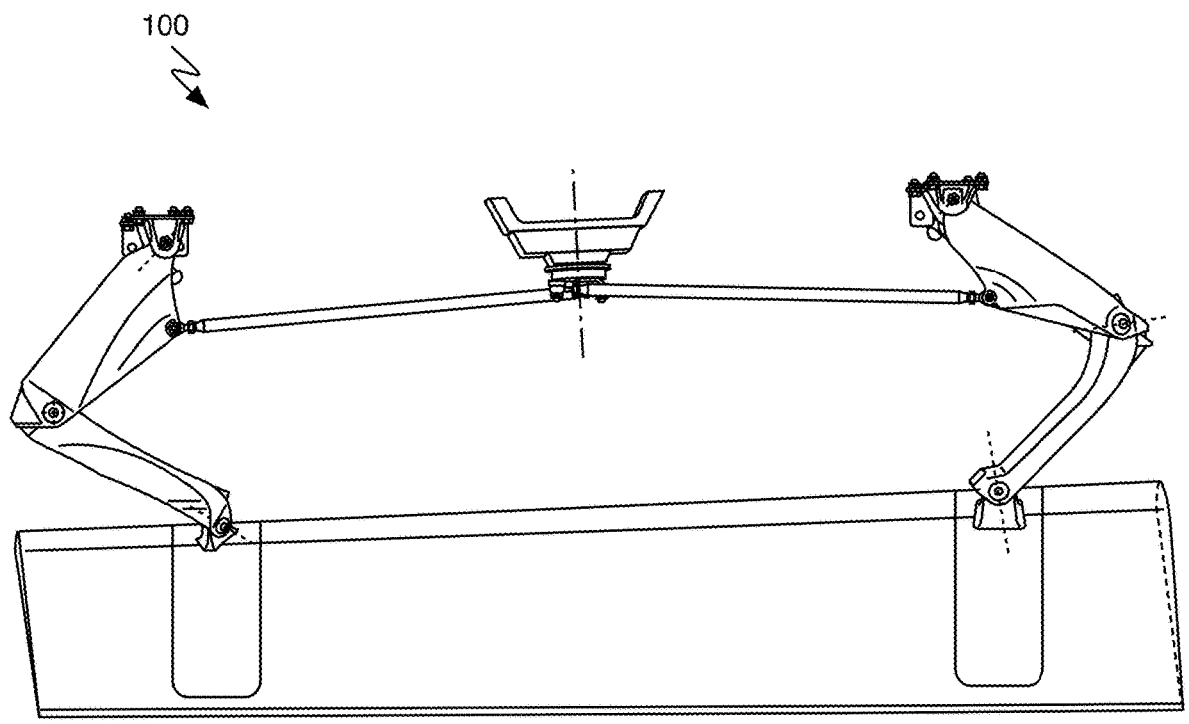
FIG. 24 is a top view of an example linkage.

In variants utilizing a tie rod or other arm interconnect linkage, a connection point/location for the tie rod can be provided at any suitable portion of an element. Preferably, an upper or lower 'flange' or other feature is provided such that the tie rod does not infringe or obstruct a rotation of the other element(s) in the retracted configuration. An example is shown in FIG. 24. The connection point of the tie rod can be provided with a (non-zero) lever arm relative to one or more joints, but can be otherwise suitably configured. Connection points for tie rods can be provided on any suitable elements such as: proximal (relative to the wing or other primary structure) elements, distal elements (relative to the wing or other primary structure), no elements, one element on each arm, a single element (across all arms), and/or otherwise suitably configured. In a first example, a tie rod connects a first proximal portion of a first proximal element on a first arm to a second proximal portion of a second proximal element on a second arm. In a second example, a tie rod connect a first arm to a second arm with a spherical joint at each end, the origin of each spherical joint located coaxial with a revolute joint which connects the proximal and distal elements of each arm. In a third example, the tie rod connects the proximal element of a first arm to the distal element of a second arm, the tie rod connected to an upper portion of each arm. However, tie rods can engage any suitable portions of arm elements.

However, the arm(s) of the linkage can include any other suitable set of arm elements, and/or be otherwise suitably configured.

The arm(s) can include a set of joints which function to constrain the motion of the body along the trajectory. Each joint individually functions to couple two bodies (e.g., at a point, about a rotational axis, etc.) and transmit loads/forces between the two bodies. Examples of bodies include: arm elements, the displaced body, or any other suitable component. Joints can include any suitable types of connections, such as revolute joints, spherical joints, fixed joints (bolted, static, etc.), and/or any other suitable types of joints. The arm can include 2 joints, 3 joints, 4 joints, and/or any other suitable number of joints. However, the arms can include any other suitable set of joints.

Revolute joints (a.k.a. hinge joints, pin joints) preferably function to join two bodies, fixing rotation about a single axis (e.g., a hinge axis, revolute axis) and constrains relative translation between connected bodies in all translation axes (e.g., excluding nonidealities/compliance in the joint). Revolute joints can include a pin or knuckle joint through a rotary bearing, a hinge, a uni-axial rotation mechanism, and/or any other suitable components. Revolute joints can define a cylindrical contract area about a revolute axis (or linear contact parallel to the revolute axis when considering nonidealities and/or a clearance). However, revolute joints can include any other suitable components and/or be otherwise suitably implemented.

Spherical joints preferably function to join two bodies, constraining relative translation between connected bodies in all translation axes (e.g., excluding nonidealities/compliance in the joint) and does not constrain the connected bodies in relative rotation. Spherical joints can include rod ends, heim joints, ball joints, 'ball and socket' connectors, and/or any other suitable components. Spherical joints can define a limited rotation range in two rotational degrees of freedom, and are preferably oriented such that a pose of the spherical joint remains within the bounds of the limited rotation range between the retracted and extended configurations (e.g., for a rod end this can be 12 degrees off center, 19 degrees from center, etc.). In a first example where the spherical joint is a rod end and includes a casing and a ball swivel nested within the casing, the rotation range can be defined by the range of motion of the ball swivel for which a hole fastener extending through the ball swivel will not contact the casing. In a second example, the spherical joint range of motion can be a manufacturer provided specification. However, spherical joints can include any other suitable components and/or be otherwise suitably implemented.

Each joint can define a joint 'pose' which can include any suitable position and/or orientation on the arm. Joints can be positioned at the ends of arm elements and/or in any other suitable location (e.g., middle of an arm element). A joint (e.g., mounting joint) on the proximal end of the arm preferably establishes a connection to the primary structure at a mount or other attachment/mounting point (e.g., $y_o$ in FIG. 27B). Similarly, a joint on the distal end of the arm establishes a connection to the displaced body (e.g., the joint configured to translate substantially along the trajectory). A position of intervening joints, located on the arm and positioned at the ends of the arm elements, can define a relative position (e.g., origin position '$y_2$' of the second revolute joint) relative to the primary structure according to: a length of the arm elements (e.g., L1 and L2 in FIG. 27B), a distance between revolute axes (e.g., distance between joint origins, minimum distance between revolute axes, 1-dimensional 'length' element extending between joints, etc.), the attachment points on the primary structure, and/or otherwise suitably defined.

The length of arm elements (with joints positioned at opposing ends, or arm element length extending between adjacent joints) along with the orientation of revolute joint axes can be viewed as covariant for any suitable 3D spiral trajectory constraints of the arm. Accordingly, the orientation of revolute joints can be provided based on the position of the joints (and vice versa).

An orientation of each revolute joint can be provided in any suitable manner, while constrained by the kinematic trajectory/3D spiral path or otherwise. Revolute joints orientations are preferably defined according to the pose of the revolute axis extending through the revolute origin (defining a position of the joint, at an endpoint/terminal length of the arm element). Revolute joints can be oriented in a substantially vertical direction, such as: aligned in a vertical direction (e.g., parallel with the aircraft body's vertical axis, the wing's vertical axis, the displaced body's vertical axis, relative to gravity, etc.), arranged within a predetermined threshold of vertical (e.g., within an angular range of vertical direction and/or weight vector), each revolute axis having a smaller skew angle with a vertical direction than with a spanwise direction on the wing, closer to vertical than lateral, within 60 deg of vertical, within 30 degrees of vertical, substantially vertical, exactly vertical (e.g., relative to a direction of gravity, relative to a yaw axis of the aircraft, etc.) and/or otherwise suitably oriented in any suitable configuration of the linkage and/or position of the linkage along the trajectory. Revolute joints oriented in a substantially vertical direction relative to the wing can be advantageous because the structure of the arm/assembly reacts the weight and/or aerodynamic loads generated by the displaced body in the extended configuration (rather than the actuator), which allows use of a smaller actuator and/or can enable a lack of persistent power supply to actuator when deployed in intermediate positions. The orientation of various joint axis can be fixed and/or variable relative to the primary structure and/or the displaced body. The pose of the proximal/mounting joint axis can be substantially fixed relative to the primary structure. For variants utilizing a revolute joint at a distal end of the linkage (e.g., end of linkage attaching to the displaced body), pose of revolute joint axis relative to the displaced body is substantially static (e.g., including and/or excluding slight deformations of the displaced body). In a specific example, the orientation of revolute joints at the distal end of the linkage is specified according to Expression (4).

Revolute joints can define any suitable relative orientation and/or angles while constrained by the kinematic trajectory/ 3D spiral path or otherwise. Between a set of two revolute joints, the geometric relationship between the revolute axes can be: parallel, skewed, orthogonal, coaxial (e.g., for redundant revolute joints arranged along parallel load paths 122), and/or in any other suitable arrangement. Revolute joints can define different skew angles (e.g., different magnitude) between joints at the ends of unique elements on the same arm, between arms, between two similar joints (e.g., mounting joints, middle joints, intervening joints, distal joints, proximal joints, etc.) on unique arms, and/or any other suitable relative orientation. In a specific example: the skew angle between the second (middle) and third (e.g., distal) revolute joints of a first arm can have a different from the skew angle of the second and third revolute joints of a second arm. In a second example, the axes of mounting joints of two arms (e.g., connecting the arms to the primary structure) can cooperatively define a non-zero skew angle, are not symmetric about a midplane centered between the arms orthogonal to the wing span, and/or each define a different magnitude skew angle relative to a vertical direction. In a third example, the distal joints of two arms (e.g., connecting the arms to the displaced body; following the 3D spiral trajectory) can define a positive skew angle, are not symmetric about a midplane, and/or each define a different magnitude skew angle relative to a vertical direction. However, the revolute joints can define any suitable relative orientation.

Figure 17:
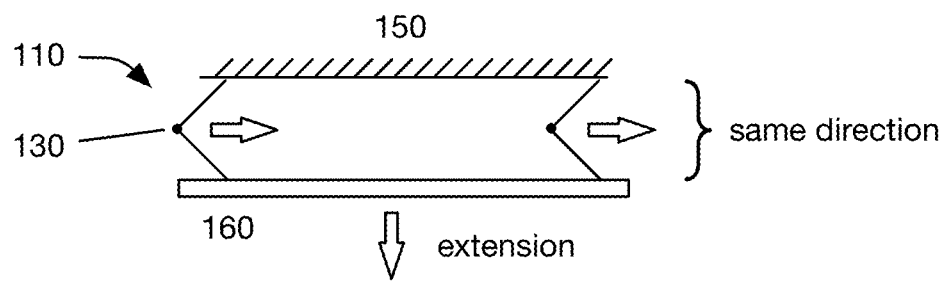
FIG. 17 is a schematic representation of a variant of the 3D extension linkage illustrating relative motion of joints during extension.
Figure 18:
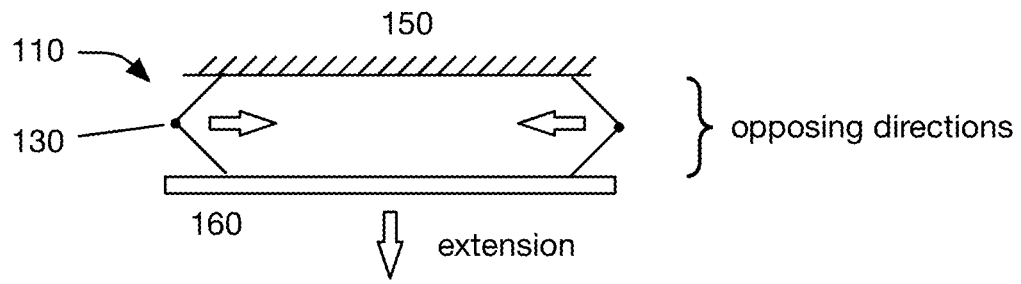
FIG. 18 is a schematic representation of a variant of the 3D extension linkage illustrating relative motion of joints during extension.

Joints can define any suitable relative motion while constrained by the kinematic trajectory/3D spiral path (during extension/retraction) or otherwise. Preferably, the pose of the joints mounting the arm(s) to the primary structure exhibit no motion relative to the wing during extension/retraction. The distal/terminal joints (connecting the arm(s) to the displaced body) can translate substantially along the trajectory during extension/retraction, and can deflect together/apart and/or change angle according to a deformation of the displaced body. During extension along the provided trajectory, middle joints connecting two arm elements can translate along any suitable axis and in the: same direction (e.g., relative to wing span, an example is shown in FIG. 17), an inboard direction, an outboard direction, forward, rearward, opposing directions (an example is shown in FIG. 18), and/or in any other suitable direction. During retraction, middle joints preferably translate in an opposing manner relative to the extension motion, but can be otherwise suitably configured. However, joints can be configured to exhibit any other suitable relative motion.

However, the linkage and/or each arm therein can include any other suitable set of joints.

In a specific example, the linkage includes two two-element arms each having revolute joints at the ends connected to the displaced body (e.g., over-constraining the motion by one degree of freedom without accounting for flexible elements). The articulation of each arm with the other is not in strong conflict during traversal of the trajectory in this example.

In the above example and related examples, additional mechanical constraints (e.g., tie rods between the arms) can be used to further constrain the articulation. Additional mechanical constraints can be connected to any elements of the arm or arms, constraining them relative to any other element or body. A tie rod, set of tie rods, or multi-segmented tie rod can constrain one arm to another connecting any joint, element, or endpoint of one arm to any joint, element, or endpoint of a second arm in any combination.

In another example, the linkage can include two arms both having spherical joints connecting the arm to the displaced body. This example constrains two of the original six degrees of freedom of the displaced body, and the three remaining degrees of freedom are otherwise constrained by further components of the linkage (e.g., additional links such as three more two-element arms, tie rods between the arms, any other suitable connections, etc.). In a related example, the linkage can include two arms wherein the first arm is connected to the displaced body by a revolute joint and the second arm is connected to the displaced body by a spherical joint; in this case, the remaining two degrees of freedom are otherwise constrained by further components (e.g., tie rods between the arms, two additional two-element arms with spherical end joints, any other suitable connections, etc.).

However, the arms of the linkage can be otherwise suitably configured.

Figure 8:
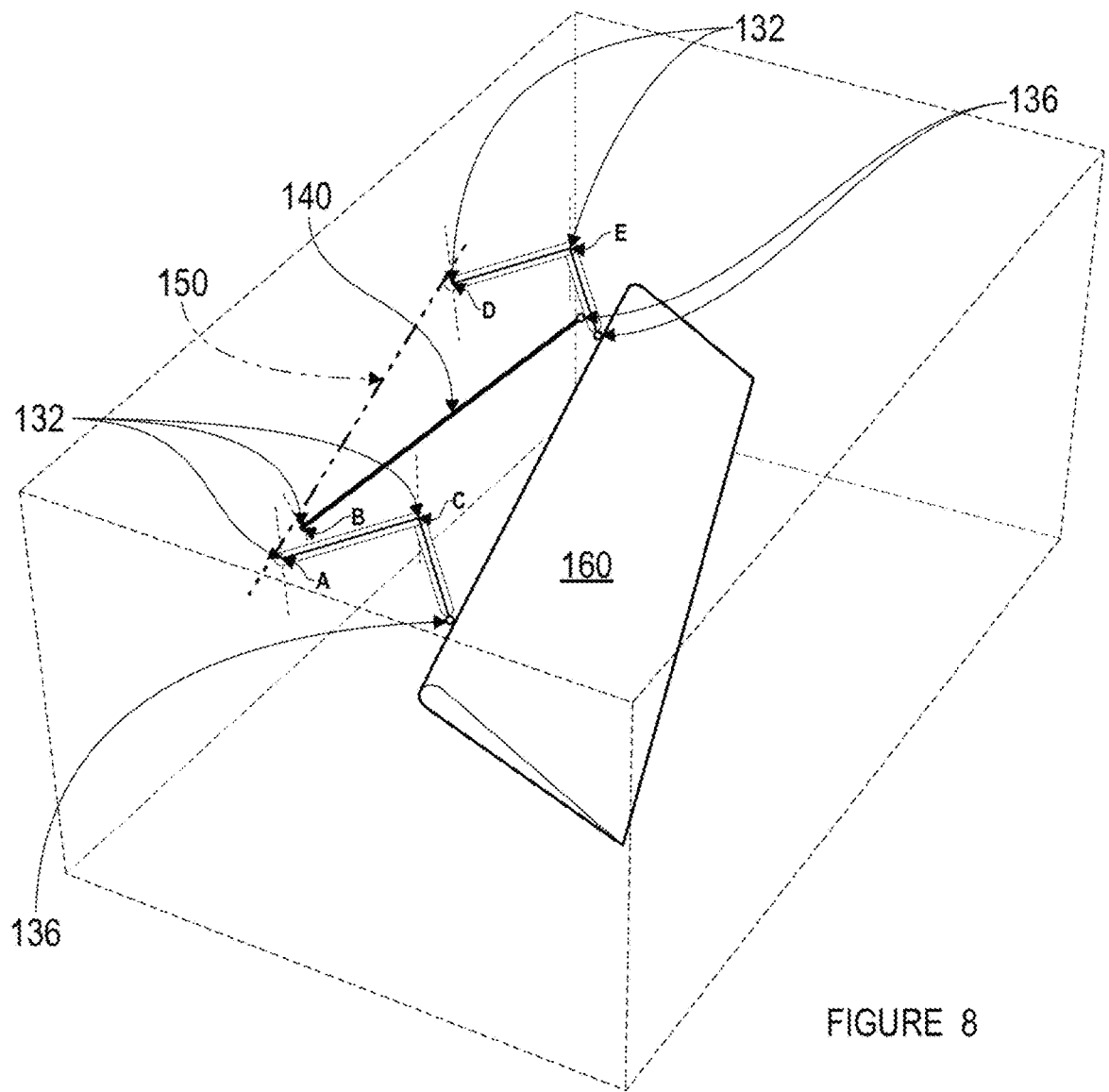
FIG. 8 depicts a view of an example embodiment of a 3D extension linkage, featuring an alternate orientation of the tie rod, and orientations of joints A-E relative to a reference axis (e.g., vertical direction).
Figure 8:
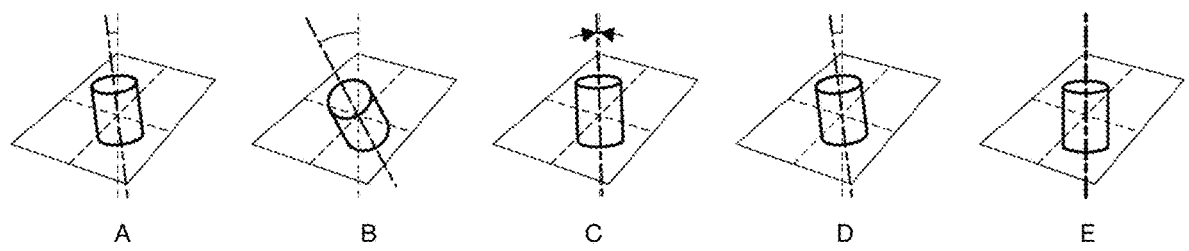

The linkage can optionally include one or more tie rods (a.k.a. arm interconnect linkage/mechanism) and one or more actuation mechanisms. The tie rods can function to constrain relative arm motion, connect the arm to the actuator, and/or perform any other suitable functionality. The tie rods can have fixed or varying length. Each tie rod can include one or more segments 142, wherein the constituent segments can actuate relative to each other, or be otherwise related to each other. The tie rods can be mounted (e.g., at the tie rod ends, along the tie rod bodies) to: element end(s) (e.g., proximal end, distal end), element bodies (e.g., of the first element, of the second element), joints, and/or any other suitable portion of the linkage. Opposing ends of the tie rod are preferably mounted to different arms, but can alternatively be mounted to the same arm. Opposing ends of the tie rod are preferably mounted to the same part of each arm (e.g., the first element, secondary element), but can alternatively be mounted to different parts of the arms (e.g., the first end is mounted to the first element of a first arm and the second end is mounted to the second element of a second arm). Joints at opposing ends of a tie rod can be of any suitable type (e.g., spherical). Ends of a tie rod preferably connect to a spanwise interior portion of the linkage, such as: a side of an arm element proximal a midplane of the plurality of arms (e.g., vertical-longitudinal plane centered between the arms), a side of the linkage proximal the actuation mechanism in a spanwise direction, above an arm, below an arm, an inboard side of an outboard arm, and/or an outboard side of an inboard arm, but can be otherwise suitably configured. In a first variant, a tie rod can connect to a proximal arm element on a first arm to a distal element on a second arm. In a second variant, a tie rod can connect an arm to the primary structure (an example is shown in FIG. 8). In a third variant, a tie rod can connect the proximal elements of two arms (examples are shown in FIGS. 9, 10, 11-1, 11-2, 12). In a fourth variant, a tie rod can connect the distal elements of two arms (an example is shown in FIG. 5).

In variants, tie rods can connect two or more arms by way of intermediate joints, multiple tie rod segments, and/or other suitable architectures. Accordingly, tie rods can act as two force members, three force members, a rigid body connector, and/or otherwise suitably connect the arms in any other suitable manner. Tie rods can, in variants, transmit tensile loads, compressive loads, and/or any other suitable loads. In a specific example, the linkage can transform in a first direction along the trajectory based on a compression force transmitted through the tie rod (e.g., extend) and in a second direction along the trajectory based on a tensile force transmitted through the tie rod (e.g., retract).

However, the linkage can include any other suitable tie rods/arm interconnect mechanisms.

The linkage can be configured with and/or include any suitable set of redundant features and/or components, which functions to ensure that failure of one or more components does not result in failure of the system (e.g., flap system; aircraft system). In particular, in variants where the linkage is configured to operate with a wing flap, failure of a wing flap or unintended imbalance of a wing flap can quickly result in decreased control authority or unintended aircraft behavior. In such variants, the effect of an individual component failure is mitigated the wing flap is still operable without the failed component or if a failed flap position can be balanced across a midplane of the aircraft without compromising aircraft control authority.

Figure 16:
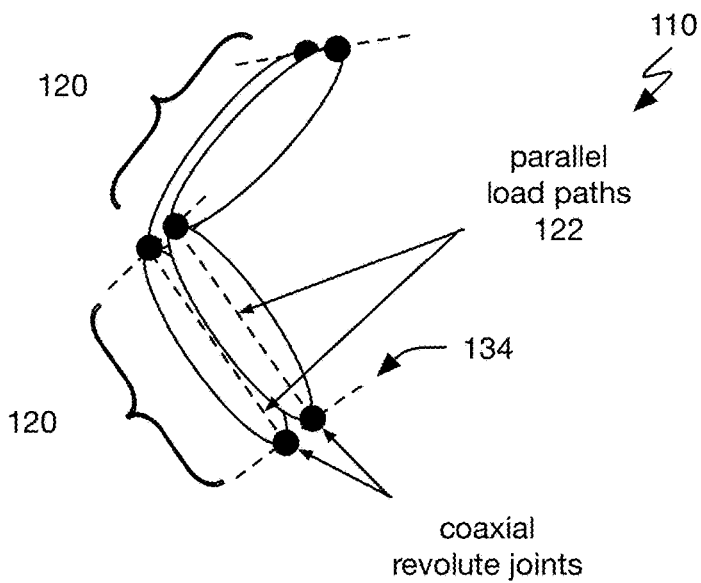
FIG. 16 is a schematic representation of a variant of an arm.

Accordingly, the linkage can include structural redundancy to mitigate component failure, such as arms with redundant and/or parallel load paths 122 passing therethrough. Structural redundancy for an arm/element can include multiple separate bodies or distinct portions of a single body, each independently configured to provide the required structural rigidity and/or load bearing constraints. Such load paths can pass through a single joint and/or distinct portions of a single joint (e.g., coaxial hinges, coaxial bearing, coaxial revolute axes), different joints, and/or be otherwise suitably configured. Alternately, each arm element can individually provide a sufficiently high factor of safety (and/or margin of safety) such that only a single load path passes through the element, and/or a sufficient degree of structural redundancy can be otherwise suitably conferred. In a first example, an arm element includes a first body and a second body, each connected to a first revolute joint about a first axis at a proximal end (e.g., relative to the primary structure) and connected to a second revolute joint about a second axis at a distal end. Each revolute joint can include a single hinge-style connection (e.g., with a pin extending through a thickness of the first body and a thickness of the second body), or can be split divided into two separate, co-axial hinges (e.g., with no pin extending through both the first and second body). A second example of an arm defining redundant load paths is shown in FIG. 16.

Additionally or alternately, the system can include duplicative elements to confer redundancy, such as redundant arms, redundant tie rods, redundant extension linkages symmetric about a central plane of the aircraft (e.g., 2 left/2 right, 4 left/4 right, etc.), actuator redundancy (an example is shown in FIG. 26), flap redundancy (an example is shown in FIG. 21), and/or any other duplicative systems. In specific examples, a two-element arm can be represented as a '<' or a '>' character depending on its orientation (e.g., with the two elements of the corresponding to the two connected line segments of the '<' or '>' characters), and the system can include redundant three arm arrangements, such as:

<< > or > < > (and their mirrors: < >> and < > <, respectively);

and redundant four arm arrangements, such as:

<< >> or < > < > or > < > < or > << >;

and/or any other suitable arrangements.

In a specific example of the system with linkages symmetric about a central plane of the aircraft (e.g., sagittal midplane), the distance between symmetric wing flaps connected to linkages can change between the extended and retracted configuration according to the spanwise displacement of the flap (e.g., both translating inboard, both translating outboard, etc.). An example is shown in FIG. 21 and FIG. 22.

However, the linkage can otherwise incorporate any other suitable redundant components/features.

Figure 19:
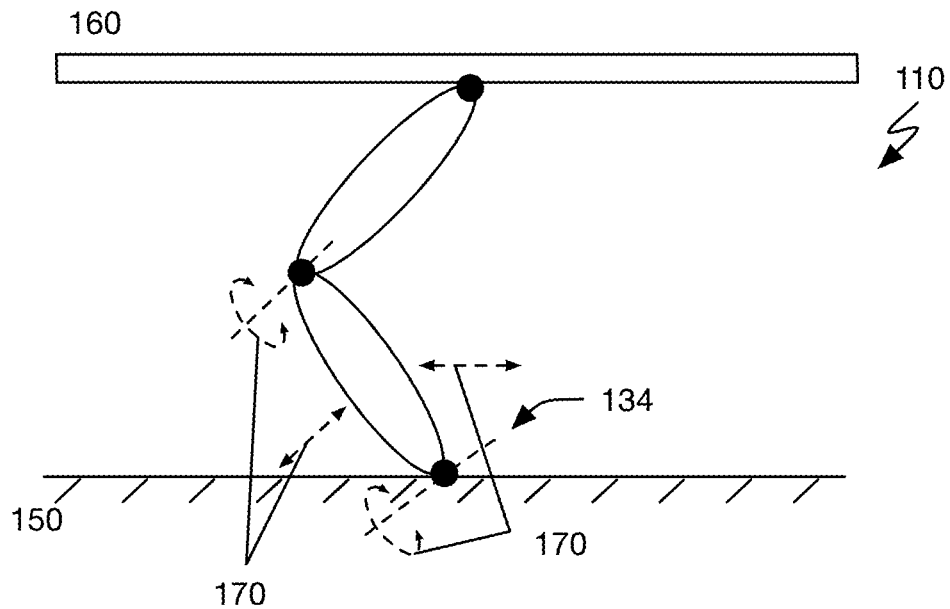
FIG. 19 is a schematic representation of a variant of a 3D extension linkage.

The linkage can include an actuation mechanism that functions to actively extend and/or retract the linkage between the retracted and extended configurations. Example linkages including an actuation mechanism are shown in FIGS. 23A-23B, 24, and 25A-B. Linkage actuation is preferably controlled by the controller, but can be remotely controlled or otherwise controlled. The actuation mechanism can directly drive the angle of one a joint in the system (e.g., by applying a torque about the axis of revolution of a revolute joint), internally change a distance between the plurality of arms, and/or externally drive the displaced body (e.g., by applying a force having at least a component aligned along the extension trajectory). Examples of actuation types are shown in FIG. 19. In case of the external driving force, the force can be applied simultaneously or sequentially to one or more arms (e.g., both arms) of the linkage (e.g., by applying the force to the displaced body directly, by a telescoping or otherwise varying the apparent length of a tie rod, member, element, or segment connected to the arms, etc.) to function as the additional connection between the arms and further constrain the motion of the linkage along the trajectory.

The actuation mechanism can be connected to (and actuate) the tie rod ends, the elements, the displaced body, and/or any other suitable component(s). The actuation mechanism preferably includes a linear actuator or a rotational actuator, but can include any other suitable actuator. The actuator can be an electrical actuator, hydraulic actuator, pneumatic actuator, and/or other actuator. Examples of the actuator include: a motor, linear actuator, pneumatic cylinder, or any other suitable actuator. The actuator's actuation axis can extend: at a non-zero angle to the displaced body's chord line (e.g., perpendicular to the chord line of the wing), along a connected tie rod's length, or along any other suitable trajectory. The actuation mechanism can be mounted to the primary structure, to the body, about a revolute axis, or to any other suitable mounting point. The actuation mechanism can drive rotation of the arm about the mounting joint, simultaneously actuate each arm (e.g., by changing an effective length of a tie rod connecting the arms), independently actuate the arms (e.g., motor actuating a joint on each arm). In variants, the actuation mechanism can change an effective length of a tie rod (or distance between joints at opposing ends of the tie rod) by telescopically extending the tie rod (e.g., along an axis extending between the ends), widening a V-shaped tie rod by changing a central angle, or translating two tie rod segments relative to one another, In a specific example, the actuation mechanism can define an absolute length, as the sum of the lengths (e.g., distance between opposing ends, largest dimension) of each tie-rod segment. The absolute length of the tie rod can remain fixed, while the effective length can change according to the relative position of the various tie rod segments. The actuation mechanism can have any suitable default configuration(s) in the event of component failure, such as: defaulting to a deployed configuration, defaulting to a retracted configuration, defaulting to current/closest boundary configuration (e.g., bi-stable), and/or engage in any other suitable operation condition in the event of component failure. The actuation mechanism can include any suitable degree of actuator redundancy, and can include: a single actuator, multiple actuators of the same type, multiple actuators of different types, and/or any other suitable actuator redundancy features. The actuation mechanism can be back-drivable or non-backdrivable, and can include any suitable locking/dis-engagement mechanisms operating in the event of a failure condition.

In a first variant, a tie rod is coupled to each of the plurality of arms by a respective spherical joint. In a first example, the actuation mechanism comprises a rotational actuator defining a rotational axis, the tie rod comprises two of segments, each segment associated with a respective arm of the plurality of arms and connected to the respective arm at the respective spherical joint, the two tie rod segments connected to the rotational actuator by respective joints offset from the rotational axis in opposing directions. The actuation mechanism can be a motor with an output shaft connected to a plate and configured to rotate the plate about the central axis, the tie rod segments each connected to a radial periphery (relative to the axis of rotation of the motor) of the plate. In a second example, the actuation mechanism comprises a linear actuator (e.g., pneumatic cylinder), the body of the actuation mechanism forming the tie rod, and configured to change a distance between the respective spherical joints connected to each arm.

In a second variant, a rotational actuator such as a motor is connected to a revolute joint of the linkage and is configured to change the angle of the revolute joint about the axis. In a specific example, the rotational actuator is a motor (or servo), a housing of the motor mounted to the primary structure, and a shaft of the motor coaxial with the revolute joint at the proximal end of the arm, wherein the shaft of the motor is connected to the proximal linkage of the arm.

In a third variant, the actuation mechanism can be a linear actuator connected at a first end to the primary structure and connected at a second end to an arm or displaced body.

However, the linkage can include any other suitable actuation mechanism(s).

Figure 9:
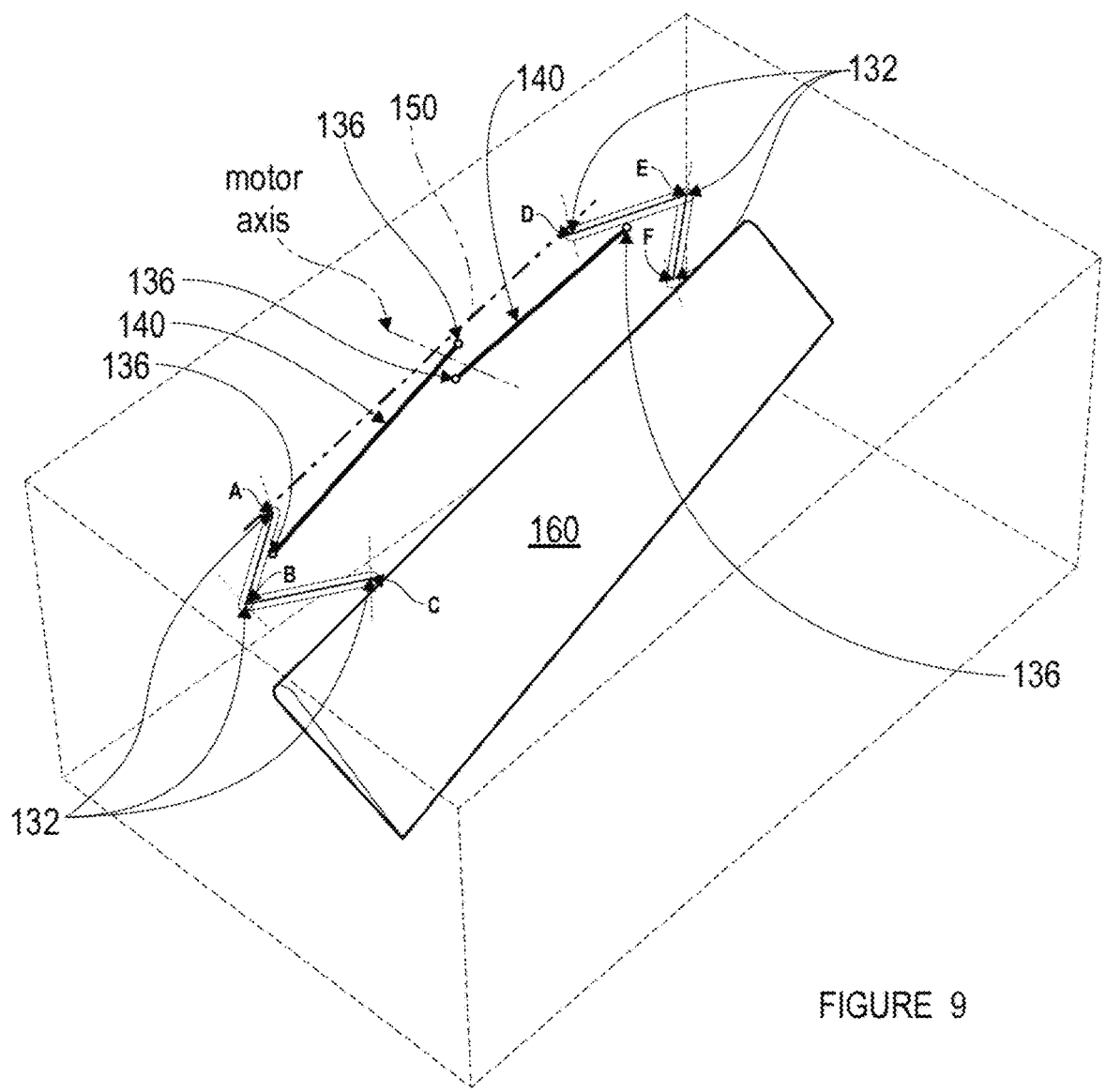
FIG. 9 depicts a view of an example embodiment of a 3D extension linkage, featuring a segmented tie rod, and orientations of joints A-F relative to a reference axis (e.g., vertical direction).
Figure 9:
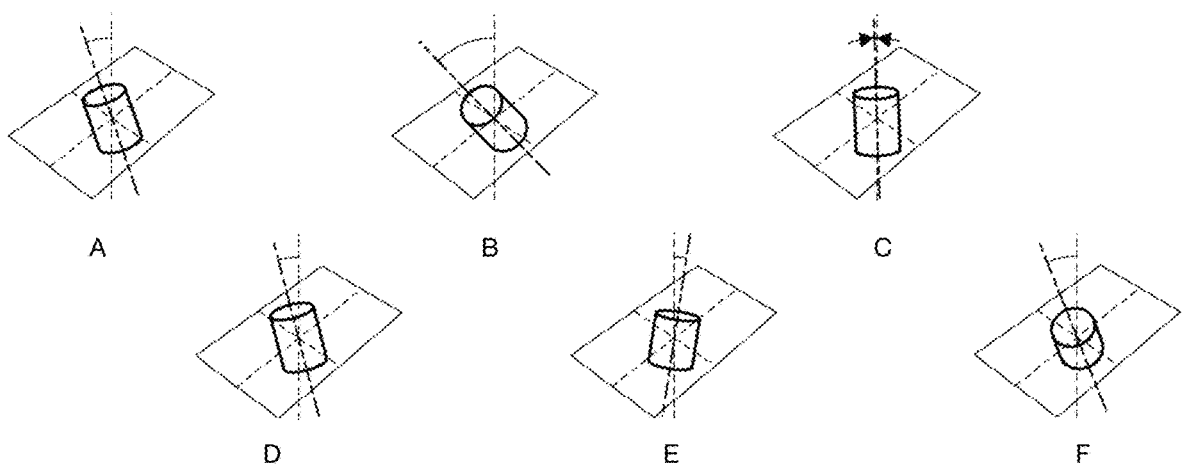

In an example, the tie rod is divided into two segments with an actuator (e.g., motor, linear actuator, pneumatic cylinder, etc.) connected in between (e.g., wherein the actuator is connected to the proximal ends of the tie rod segments and/or to a joint connecting the tie rod segments). The distal ends of each tie rod segment are each connected to a body of a first element (of each arm). When driven, the actuator displaces the segments of the tie rod (changing the apparent length) and transfers force to the arms at either end of the tie rod, causing them to extend or retract (examples are shown in FIG. 9). This example places both of tie rods on the side away from the wing spar, and therefore gives the tie rods better leverage, which can help with flexibility issues.

The linkage can optionally include a physical stop and/or bumper which functions to dampen contact of one or more elements of the arm with any component. Physical stops can be arranged on the primary structure, on the arm (e.g., proximal element, distal element), on the displaced body, on the actuation mechanism, and/or in any other suitable location. Physical stops can be any suitable type and/or material construction (e.g., elastomer, deformable polymer, spring steel, etc.), rigid, flexible, and/or can otherwise suitably dampen contact. Additionally or alternately, motion of the linkage can be halted by in response to sensed contact at a limit switch, power threshold of the actuator, and/or other mechanism.

The linkage can optionally include and/or be used with (e.g., as a related system) a controller. The controller can be distributed across multiple nodes or centralized at a single point (e.g., a centralized controller that is communicatively coupled with controllable components of the linkage such as the actuation mechanism, etc.). The controller is preferably located onboard the aircraft, but can alternatively be remote from the aircraft or otherwise arranged. The controller functions to execute command instructions based on input data to control elements of the linkage. In examples, the controller can control the actuation mechanism to extend or retract the flaps of an aircraft. In examples, the controller can include a servo-feedback controller that maintains closed loop control over the state of the linkage (e.g., between the extended and retracted configuration). The controller can be employed in conjunction with any suitable control scheme, such as: closed loop, open loop, linear, non-linear, feedforward, feedback, MPC, LQR, PID, and/or any other suitable control scheme.

The controller can be used with a set of sensors, which function to determine a position of the linkage along the trajectory, which can be used to control the actuation mechanism. Sensors can additionally function to provide force sensing for various components of the system. Sensors can include position encoders (absolute, incremental, linear, rotary), potentiometers, string potentiometers, optical sensors (e.g., proximity sensors), hall effect sensors, eddy-current sensors, capacitive displacement sensors, ultrasonic sensors, limit switches, strain gages, force sensors, and/or any other suitable sensors. In a specific example, encoders arranged at one or more of the joints (e.g., revolute joints) can provide accurate pose estimation of the displaced body. Multiple encoders distributed across unique joints can provide any suitable degree of sensing redundancy. In a second example, sensors can include encoders on a rotary actuator (e.g., motor/servo). In a third example, sensors can include one or more limit switches, configured to be engaged by the linkage in an extended and/or retracted configuration. However, the controller can otherwise suitably determine position of the linkage along the trajectory. Strain gages and/or other force sensor can be integrated into any suitable arm elements and/or portions of a tie rod, thereby providing force sensing to be employed for various linkage and/or aircraft control. Alternately, high precision measurement of relative rotation of one or more joints of the linkage can enable force estimation of various linkage components.

However, the controller can include any other suitable set of sensors and/or otherwise suitably determine linkage position and/or forces.

However, the controller can additionally or alternatively execute or implement any suitable functionality of the system components as described herein or otherwise suitably defined, in any suitable context or application (e.g., non-aeronautical applications such as robotics).

4. Linkage Examples

In one variant, a first and a second arm (each having a proximal element and a distal element, a revolute joint connecting the proximal element to the primary structure, and a revolute joint connecting the proximal and distal elements) are connected by a tie rod. In this variation, the first arm and the second arm can lie in parallel planes or can be mirrored about a central plane (e.g., vertical-longitudinal plane centered between the first and second arms, sagittal plane of the displaced body, etc.).

In one example of this variation (e.g., illustration in FIG. 8), the tie rod is mounted to the proximal elements of the first and second arms, and is constrained on either end by spherical joints, wherein the spherical joints can be centered along the axis of the revolute joint connecting the proximal element and the distal element of each arm. The tie rod can optionally be connected to the arm joint by a revolute joint instead of a spherical joint. This example can optionally include a set of spherical joints connecting the distal element to the displaced body. This example can optionally include a tie rod (or third arm) which defines the angle of the displaced body (e.g., flap angle), wherein the third arm can include a revolute joint connected to the primary structure and a spherical joint connected to one of the elements of the first or second arms (e.g., the distal element of the second arm; the distal element of an arm opposing the tie rod's primary structure mounting point).

Figure 10:
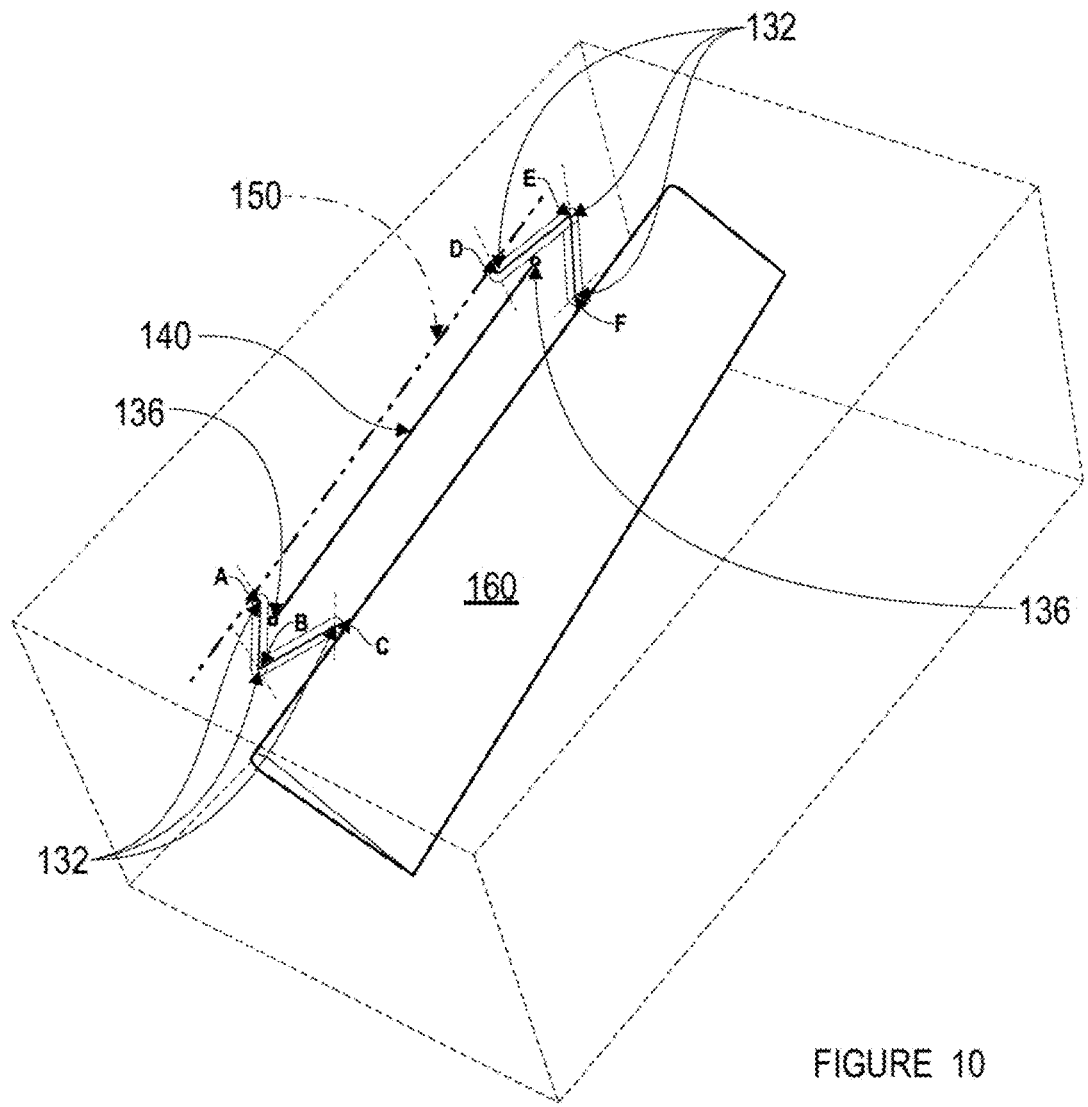
FIG. 10 depicts an isometric perspective view of an example embodiment of a 3D extension linkage, featuring an alternate orientation of the arms, and orientations of joints A-F relative to a reference axis (e.g., vertical direction).
Figure 10:
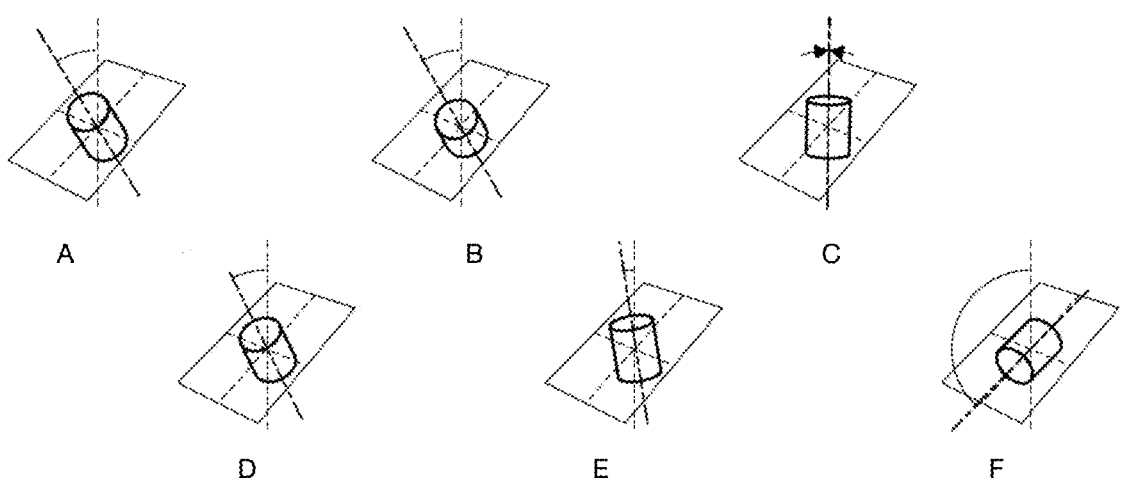
Figure 11:
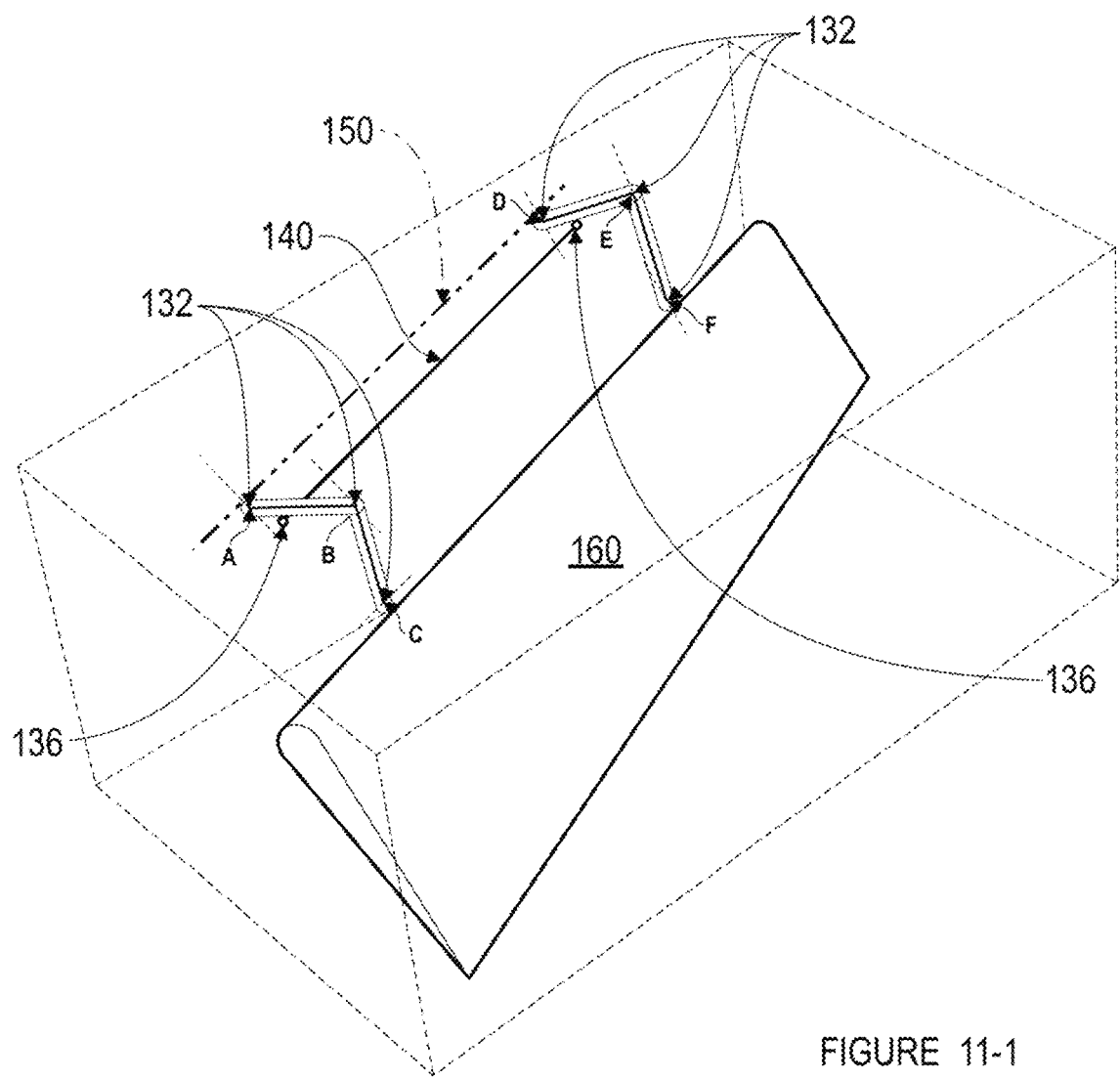
FIGS. 11-1 and 11-2 depict views of an example embodiment of a 3D extension linkage, featuring a first and a second alternate orientation of the tie rod, respectively, and orientations of joints A-F relative to a reference axis (e.g., vertical direction), respectively.
Figure 1:
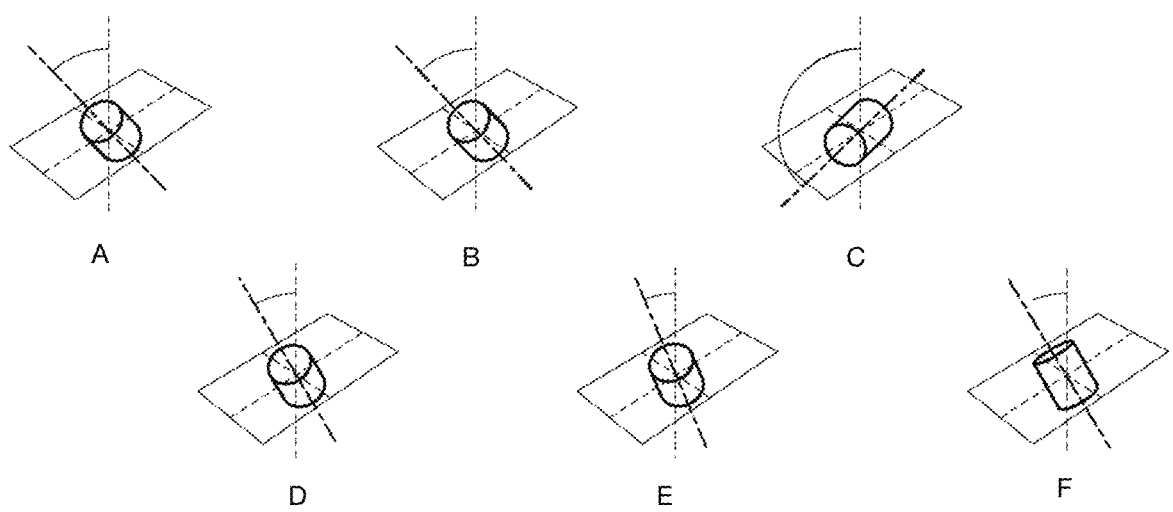
Figure 11:
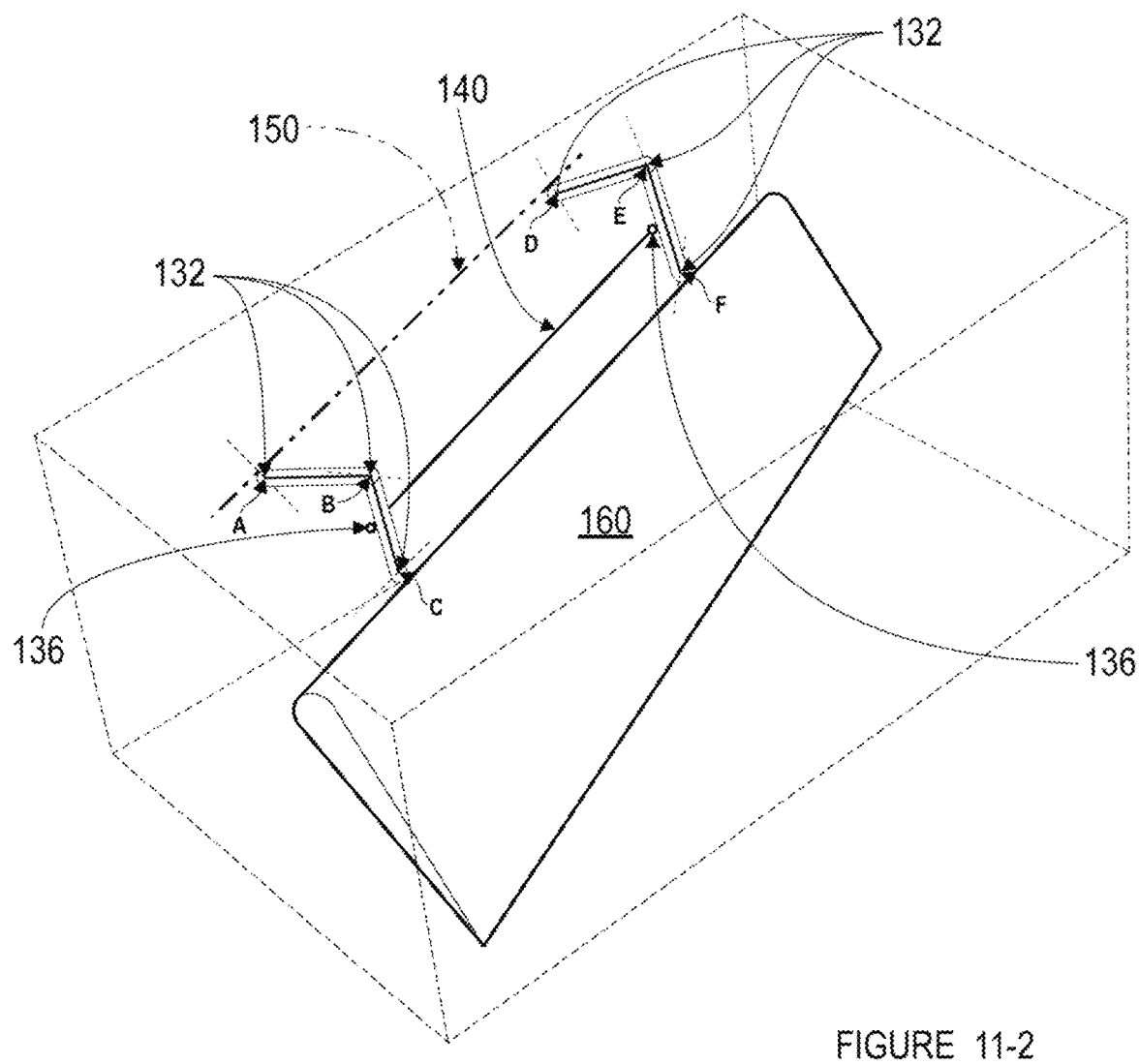
Figure 2:
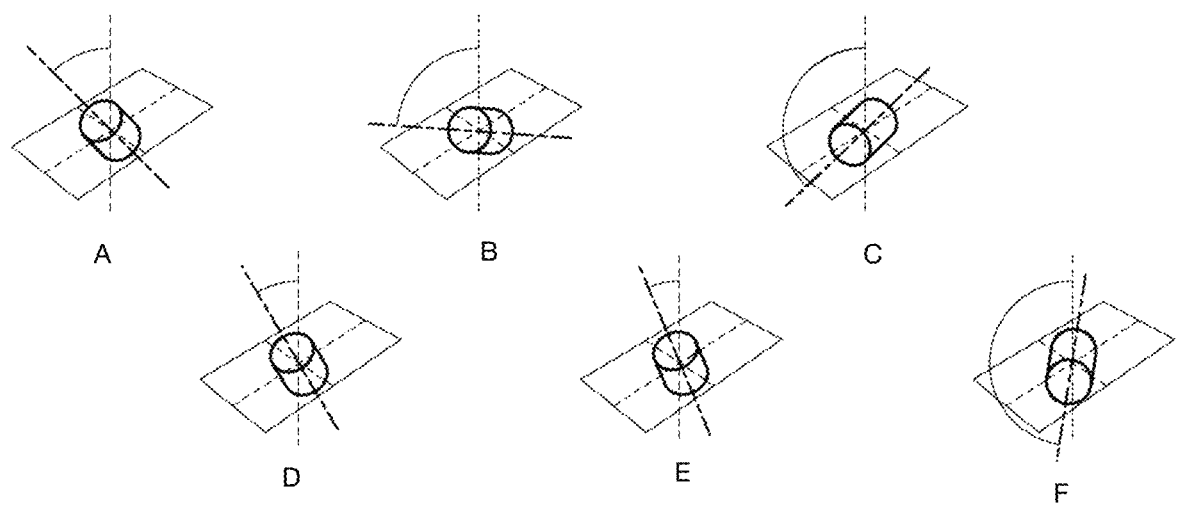

In a second example of this variation, each of the arms is connected to the displaced body by a revolute joint. The joints on the first arm can reflect the joints on the second arm when mirrored about a central plane (e.g., plane extending perpendicular the span of the displaced body). The axes of the revolute joint attached to the displaced body can lie in the same plane. The tie rod is constrained on either end by spherical joints, wherein the spherical joints can be connected to a middle portion of the proximal elements of each arm, with the ends of the tie rod connecting on opposite sides of the revolute joint (e.g., above the revolute joint connected to the primary structure on the first arm and below the corresponding revolute joint on the second arm, as illustrated in FIG. 10). In an alternate version of the second example, the tie rod connects on the same side of the joints connected to the primary structure (e.g., below the joint on each arm, as illustrated in FIGS. 11-1 and 11-2).

Figure 12:
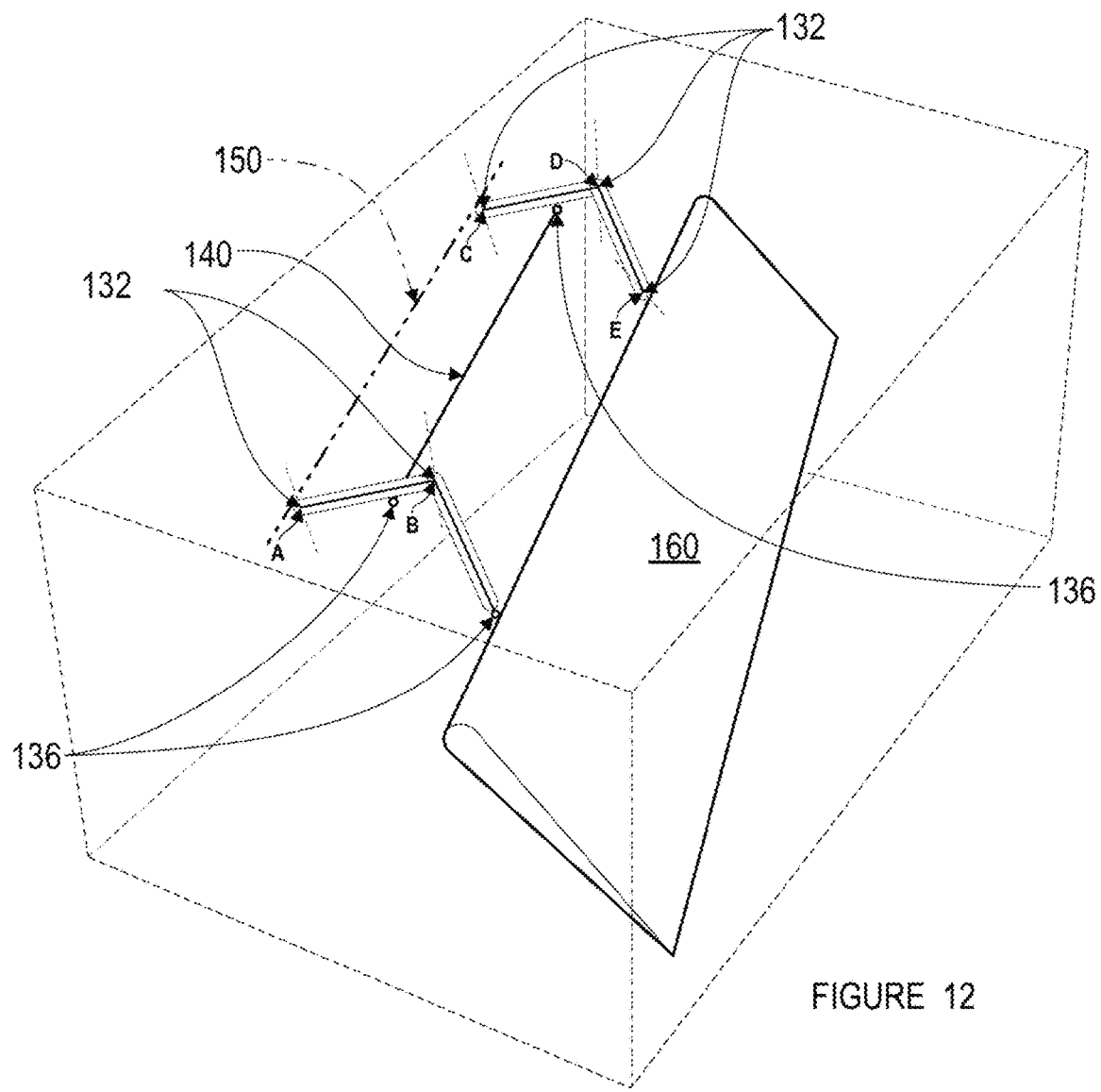
FIG. 12 depicts a view of an example embodiment of a 3D extension linkage, featuring an alternate orientation of the tie rod, and orientations of joints A-E relative to a reference axis (e.g., vertical direction).
Figure 12:
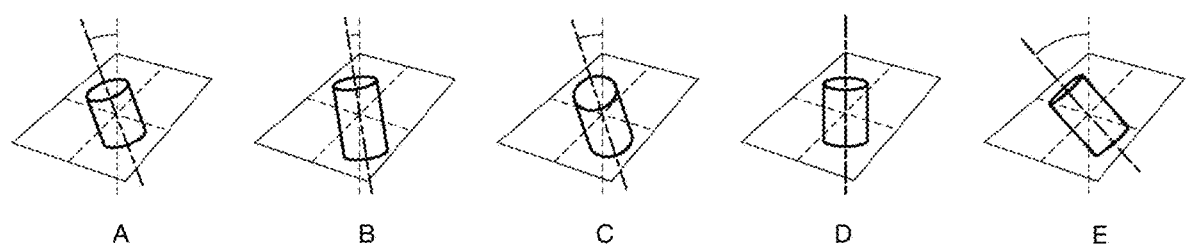

In a third example of this variation, the tie rod connects to an arbitrary location on the first arm, and to an arbitrary location on the second arm (e.g., connects the bottom of the proximal element of the first arm and the bottom of the proximal element of the second arm, as illustrated in FIG. 12). The first arm can optionally be connected to the displaced body (e.g., wing flap) with a spherical joint instead of a revolute joint. The second arm can optionally be connected to the displaced body with a spherical joint instead of a revolute joint.

In one variant, the linkage can be defined according to the following dimensionless tables (e.g., in meters with revolute origins defining a position relative to aircraft origin, arbitrary units relative to arbitrary origin, etc.) for arms A and B, where X is the longitudinal direction (rearward positive), Y is the lateral direction (rightward positive), and Z is the vertical direction (upward positive):

TABLE 1

| | Retracted | | |
|---|---|---|---|
| | X | Y | Z |
| RevoluteA1Origin | 3.2350 | −1.0660 | 1.1300 |
| RevoluteA1Axis | −0.1952 | 0.0976 | 0.9759 |
| RevoluteA2Origin | 3.2846 | −0.8182 | 1.0928 |
| RevoluteA2Axis | −0.2112 | 0.4914 | 0.8449 |
| RevoluteA3Origin | 3.2920 | −1.0660 | 1.1300 |
| RevoluteA3Axis | −0.4465 | 0.1001 | 0.8892 |
| RevoluteB1Origin | 3.1210 | −1.8530 | 1.2200 |
| RevoluteB1Axis | −0.1925 | 0.1925 | 0.9623 |
| RevoluteB2Origin | 3.1103 | −2.0664 | 1.2520 |
| RevoluteB2Axis | −0.2403 | −0.1356 | 0.9612 |
| RevoluteB3Origin | 3.1660 | −1.8530 | 1.2200 |
| RevoluteB3Axis | −0.0930 | 0.4967 | 0.8629 |
| BraceAPosition | 3.3077 | −0.9815 | 1.1890 |
| BraceBPosition | 3.1571 | −1.9124 | 1.2930 |
| DriveOrigin | 3.2230 | −1.4950 | 1.2230 |
| DriveAxis | −0.9889 | 0.1483 | 0.0000 |
| DriveAPosition | 3.2273 | −1.4660 | 1.2131 |
| DriveBPosition | 3.2171 | −1.5341 | 1.2330 |

TABLE 2

| | Extended | | |
|---|---|---|---|
| | X | Y | Z |
| RevoluteA1Origin | 3.2350 | −1.0660 | 1.1300 |
| RevoluteA1Axis | −0.1952 | 0.0976 | 0.9759 |
| RevoluteA2Origin | 3.4202 | −0.8901 | 1.1271 |
| RevoluteA2Axis | 0.0285 | 0.4389 | 0.8981 |
| RevoluteA3Origin | 3.6010 | −1.0621 | 1.1031 |
| RevoluteA3Axis | 0.1688 | 0.0109 | 0.9856 |
| RevoluteB1Origin | 3.1210 | −1.8530 | 1.2200 |
| RevoluteB1Axis | −0.1925 | 0.1925 | 0.9623 |
| RevoluteB2Origin | 3.2865 | −1.9824 | 1.2704 |
| RevoluteB2Axis | 0.0390 | −0.0422 | 0.9983 |
| RevoluteB3Origin | 3.4442 | −1.8431 | 1.1970 |
| RevoluteB3Axis | 0.4921 | 0.3814 | 0.7826 |
| BraceAPosition | 3.3370 | −1.0451 | 1.2012 |
| BraceBPosition | 3.1957 | −1.8443 | 1.2871 |
| DriveOrigin | 3.2230 | −1.4950 | 1.2230 |
| DriveAxis | −0.9889 | 0.1483 | 0.0000 |
| DriveAPosition | 3.2189 | −1.5224 | 1.2093 |
| DriveBPosition | 3.2282 | −1.4604 | 1.2439 |

In a first example, the one arm (e.g., arm A, arm B) of the linkage is defined the revolute joint origins and/or orientations selected from Table 1 and/or Table 2. In a second example, the linkage is fully defined exactly according to Table 1 in the retracted configuration and/or Table 2 in the extended configuration. In a third example, each revolute joint origin position and/or orientation is within a margin of the values in Table 1 and/or Table 2, where the margin can be: <0.0001, 0.0001, 0.0005, 0.001, 0.005, 0.01, and/or any appropriate margin. The margin can be the same or different for each joint, different between joint orientations and joint positions, and/or otherwise suitably defined.

The system of the preferred embodiment and variations thereof can be embodied and/or implemented at least in part as a machine configured to receive a computer-readable medium storing computer-readable instructions. The instructions are preferably executed by computer-executable components preferably integrated with and/or part of the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and/or method Blocks, which can be combined in any suitable permutation or combination and/or omitted in whole or in part from variations of the preferred embodiments.

As a person skilled in the art will recognize from the previous detailed description and from the figures and claims, modifications and changes can be made to the preferred embodiments of the invention without departing from the scope of this invention defined in the following claims.

What is claimed is:

1. A system, comprising:
   a wing, said wing comprising:
      an upper surface;
      a lower surface; and
      a primary structure at a rear of said wing, wherein said upper surface and said lower surface extend rearward of said primary structure
   a wing flap;
   a flap extension linkage structurally coupled to said primary structure on a forward side of the linkage and structurally coupled to said flap on a rearward side of the linkage,
   wherein said flap extension linkage is configured to transform the wing flap between a retracted configuration and an extended configuration, and wherein said flap extension linkage resides entirely between said upper surface and said lower surface of said wing rearward of said primary structure when said wing flap is in the retracted configuration, wherein said flap extension linkage comprises:
      a plurality of arms, each arm comprising:
         a proximal element;
         a distal element;
         a wing mount fixed to the primary structure;
         a first revolute joint connecting the proximal element to the wing mount;
         a second revolute joint connecting the proximal element to the distal element; and
         a third revolute joint connecting the distal element to the wing flap
         an actuation mechanism coupled to the plurality of arms and configured to transform the wing flap between a retracted configuration and an extended configuration; and
         a tie rod coupled to each of the plurality of arms by a respective spherical joint.

2. The system of claim 1 wherein the wing is forward swept, and wherein the spanwise position of the wing flap in the extended configuration is located inboard of the spanwise position of the wing flap in the retracted configuration.

3. The system of claim 2 wherein a collective stiffness of the flap extension linkage exceeds a stiffness of the wing flap, wherein the wing flap deforms during transformation between the retracted configuration and extended configuration.

4. The system of claim 1 wherein a collective stiffness of the flap extension linkage exceeds a stiffness of the wing flap, wherein the wing flap deforms during transformation between the retracted configuration and extended configuration.

5. The system of claim 1, wherein the revolute axes of the second and third revolute joints of each arm are askew and cooperatively define a skew angle.

6. The system of claim 5, wherein the plurality of arms comprises a first arm and a second arm, wherein the skew angle of the second and third revolute joints of the first arm is different from the skew angle of the second and third revolute joints of the second arm.

7. The system of claim 1, wherein:
   the actuation mechanism comprises a rotational actuator defining a rotational axis;
   the tie rod comprises two segments, wherein each segment is connected to a different arm of the plurality of arms at the respective spherical joint, wherein the two tie rod segments are connected to the rotational actuator by a first and second joint, respectively, wherein the first and second joints are offset from the rotational axis in opposing directions.

\* \* \* \* \*